(12) United States Patent
Ren et al.

(10) Patent No.: US 11,128,510 B2
(45) Date of Patent: Sep. 21, 2021

(54) DATA TRANSMISSION METHOD, USER EQUIPMENT, AND NETWORK SIDE DEVICE

(71) Applicant: Huawei Technologies Co., Ltd., Shenzhen (CN)

(72) Inventors: Haibao Ren, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 16/165,109

(22) Filed: Oct. 19, 2018

(65) Prior Publication Data
US 2019/0052502 A1 Feb. 14, 2019

Related U.S. Application Data

(63) Continuation of application No. PCT/CN2017/078211, filed on Mar. 24, 2017.

(30) Foreign Application Priority Data

Apr. 22, 2016 (CN) .......................... 201610257617.0

(51) Int. Cl.
*H04L 27/26* (2006.01)
*H04L 5/00* (2006.01)
(Continued)

(52) U.S. Cl.
CPC .......... *H04L 27/2649* (2013.01); *H04B 7/26* (2013.01); *H04L 5/0035* (2013.01);
(Continued)

(58) Field of Classification Search
None
See application file for complete search history.

(56) References Cited

U.S. PATENT DOCUMENTS 9,008,585 B2 * 4/2015 Xiao .................... H04L 1/0077
455/67.11
9,143,207 B2 * 9/2015 Kim ...................... H04B 7/024
(Continued)

FOREIGN PATENT DOCUMENTS

| CN | 101686080 A | 3/2010 |
|----|-------------|--------|
| CN | 102164372 A | 8/2011 |

(Continued)

OTHER PUBLICATIONS

"CoMP schemes for non-ideal backhaul and inter-eNodeB signaling," 3GPP TSG RAN WG1 Meeting #74bis, Guangzhou, China, R1-134356, pp. 1-5, 3rd Generation Partnership Project, Valbonne, France (Oct. 7-11, 2013).

(Continued)

*Primary Examiner* — Kodzovi Acolatse
(74) *Attorney, Agent, or Firm* — Leydig, Voit & Mayer, Ltd.

(57) ABSTRACT

This application relates to a data transmission method. The method includes: receiving, in a subframe, first data and first demodulation reference signal(s) that are sent by a first network side device by using n antenna port(s), and second data and second demodulation reference signal(s) that are sent by a second network side device by using m antenna port(s), where time-frequency resources occupied by the first demodulation reference signal(s) are different from time-frequency resources occupied by the second demodulation reference signal(s), and a time-frequency resource occupied by the first data and that occupied by the second data at least partly overlap; and performing demodulation processing on the data based on the first demodulation reference signal(s) and the second demodulation reference signal(s). The data transmission method may be applied to coordinated multipoint transmission/reception in which a (Continued)

plurality of network side devices that are not quasi-co-located simultaneously send data to user equipment.

20 Claims, 12 Drawing Sheets

(51) Int. Cl.
  *H04B 7/26* (2006.01)
  *H04W 72/04* (2009.01)
  *H04W 88/02* (2009.01)

(52) U.S. Cl.
  CPC ......... *H04L 5/0048* (2013.01); *H04W 72/044* (2013.01); *H04L 5/0051* (2013.01); *H04W 88/02* (2013.01)

(56) References Cited

U.S. PATENT DOCUMENTS

| | | | |
|---|---|---|---|
| 9,893,853 B2* | 2/2018 | Yi | H04L 1/08 |
| 9,923,684 B2 | 3/2018 | Ng et al. | |
| 2010/0322176 A1* | 12/2010 | Chen | H04L 5/0057 370/329 |
| 2012/0155406 A1 | 6/2012 | Kim et al. | |
| 2012/0269140 A1* | 10/2012 | Nam | H04B 7/024 370/329 |
| 2013/0039203 A1* | 2/2013 | Fong | H04B 7/024 370/252 |
| 2013/0155968 A1 | 6/2013 | Pelletier et al. | |
| 2013/0301434 A1 | 11/2013 | Krishnamurthy et al. | |
| 2013/0343299 A1* | 12/2013 | Sayana | H04B 7/0417 370/329 |
| 2014/0112253 A1* | 4/2014 | Nagata | H04L 5/005 370/328 |
| 2014/0133395 A1 | 5/2014 | Nam et al. | |
| 2014/0185495 A1 | 7/2014 | Kuchibhotla et al. | |
| 2014/0192732 A1 | 7/2014 | Chen et al. | |
| 2014/0192734 A1* | 7/2014 | Ng | H04L 5/0053 370/329 |
| 2014/0241454 A1 | 8/2014 | Kim et al. | |
| 2015/0063234 A1* | 3/2015 | Park | H04L 5/0035 370/329 |
| 2015/0131560 A1* | 5/2015 | Von Elbwart | H04W 72/042 370/329 |
| 2015/0189626 A1 | 7/2015 | Zhu et al. | |
| 2015/0215093 A1 | 7/2015 | Kim et al. | |
| 2015/0249517 A1* | 9/2015 | Seo | H04W 72/042 370/329 |
| 2015/0280877 A1 | 10/2015 | Chen et al. | |
| 2015/0282155 A1 | 10/2015 | Webb et al. | |
| 2015/0289235 A1 | 10/2015 | Park et al. | |
| 2015/0304997 A1 | 10/2015 | Park et al. | |
| 2015/0341099 A1 | 11/2015 | Kang et al. | |
| 2015/0341877 A1 | 11/2015 | Yi et al. | |
| 2015/0365152 A1 | 12/2015 | Frenne et al. | |
| 2015/0382376 A1 | 12/2015 | Tanaka | |
| 2016/0036571 A1* | 2/2016 | Park | H04B 17/382 370/330 |
| 2016/0044439 A1 | 2/2016 | Mittal et al. | |
| 2016/0119947 A1 | 4/2016 | Park et al. | |
| 2016/0157108 A1 | 6/2016 | Park et al. | |
| 2017/0063503 A1* | 3/2017 | Liu | H04L 5/0091 |
| 2017/0223686 A1 | 8/2017 | You et al. | |
| 2017/0237535 A1* | 8/2017 | Park | H04B 7/024 370/329 |
| 2018/0083681 A1 | 3/2018 | Faxér et al. | |
| 2018/0212732 A1* | 7/2018 | You | H04L 5/0091 |
| 2018/0270799 A1* | 9/2018 | Noh | H04L 1/1822 |
| 2019/0386854 A1 | 12/2019 | Kim et al. | |

FOREIGN PATENT DOCUMENTS

| | | |
|---|---|---|
| CN | 102170335 A | 8/2011 |
| CN | 103298117 A | 9/2013 |
| CN | 103298118 A | 9/2013 |
| CN | 103298119 A | 9/2013 |
| CN | 104247291 A | 12/2014 |
| CN | 104272833 A | 1/2015 |
| CN | 104919724 A | 9/2015 |
| CN | 105122916 A | 12/2015 |
| CN | 105144612 A | 12/2015 |
| CN | 105432026 A | 3/2016 |
| EP | 2384049 A1 | 11/2011 |
| EP | 2654333 A1 | 10/2013 |
| EP | 2775642 A2 | 9/2014 |
| EP | 2800286 A1 | 11/2014 |
| EP | 2905910 A1 | 8/2015 |
| EP | 2883324 B1 | 10/2016 |
| EP | 2524559 B1 | 11/2016 |
| JP | 2016506690 A | 3/2016 |
| WO | 2009076995 A1 | 6/2009 |
| WO | 2011075908 A1 | 6/2011 |
| WO | 2014010911 A1 | 1/2014 |
| WO | 2014129716 A1 | 8/2014 |
| WO | 2014176034 A1 | 10/2014 |
| WO | 2015037885 A1 | 3/2015 |
| WO | 2015099330 A1 | 7/2015 |
| WO | 2016018079 A1 | 2/2016 |
| WO | 2016021969 A1 | 2/2016 |
| WO | 2017171481 A1 | 10/2017 |

OTHER PUBLICATIONS

"3rd Generation Partnership Project; Technical Specification Group Radio Access Network; Evolved Universal Terrestrial Radio Access (E-UTRA); Physical layer procedures (Release 13)", pp. 1-3613, 3GPP TS 36.213 V13.1.1, 3rd Generation Partnership Project—Valbonne, France (Mar. 2016).

"3rd Generation Partnership Project;T echnical Specification Group Radio Access Network; Evolved Universal Terrestrial Radio Access (E-UTRA); Multiplexing and channel coding (Release 13)," 3GPP TS 36.212 V13.1.0, pp. 1-129, 3rd Generation Partnership Project—Valbonne, France (Mar. 2016).

"3rd Generation Partnership Project; Technical Specification Group Radio Access Network; Evolved Universal Terrestrial Radio Access (E-UTRA); Physical channels and modulation (Release 13)," 3GPP TS 36.211 V13.1.0, pp. 1-155, 3rd Generation Partnership Project—Valbonne, France (Mar. 2016).

"3rd Generation Partnership Project; Technical Specification Group Radio Access Network; Evolved Universal Terrestrial Radio Access Network (E-UTRAN); X2 application protocol (X2AP) (Release 13)," 3GPP TS 36.423 V13.3.0 pp. 1-230, 3rd Generation Partnership Project—Valbonne, France (Mar. 2016).

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.1.0, pp. 1-551, 3rd Generation Partnership Project—Valbonne, France (Mar. 2016).

"Remaining issues on quasi co-location between CSI-RS, CRS and DMRS," 3GPP TSG-RAN WG1#70bis meeting, San Diego, USA, R1-124558, XP050662440, pp. 1-5, 3rd Generation Partnership Project, Valbonne, France (Oct. 8-12, 2012).

"LTE; Evolved Universal Terrestrial Radio Access (E-UTRA); Physical layer procedures, (3GPP TS 36.213 version 12.4.0 Release 12," ETSI TS 136 213 V12.4.0, XP055310306, pp. 1-228, 3rd Generation Partnership Project, Valbonne, France (Feb. 2015).

"Downlink control signaling for CoMP," 3GPP TSG-RAN WG1#68 bis, Jeju, Korea, R1-121395, XP050599682, pp. 1-4, 3rd Generation Partnership Project, Valbonne, France (Mar. 2012).

Alsheikhi et al.,"Machine Learning in Wireless Sensor Networks: Algorithms, Strategies, and Applications," IEEE Communications Surveys and Tutorials,vol. 16, Issue:4, Fourthquarter 2014, pp. 1-24, XP011565128, Institute of Electrical and Electronics Engineers—New York, New York (Apr. 24, 2014).

Candes et al.,"Robust Uncertainty Principles:Exact Signal Reconstruction from Highly Incomplete Frequency Information," pp. 1-41 (Jun. 2004; Revised Aug. 2005).

(56) References Cited

OTHER PUBLICATIONS

Charikar et al.,"Finding Frequent Items in Data Streams", in Proceedings of the 29th International Colloquium on Automata, Languages and Programming, pp. 1-11 (2002).
Donoho,"Compressed Sensing," IEEE Transactions on Information Theory, vol. 52, No. 4, pp. 1-18, Institute of Electrical and Electronics Engineers—New York, New York (Apr. 2006).
Haupt et al.,"Robust Support Recovery Using Sparse Compressive Sensing Matrices", 2011 45th Annual Conference on Information Sciences and Systems, pp. 1-6 (May 12, 2011).
"3rd Generation Partnership Project; Technical Specification Group Radio Access Network; Study on RAN Improvements for Machine-Type Communications (Release 11)", 3GPP TR 37.868 V11.0.0 (Sep. 2011), pp. 1-28, 3rd Generation Partnership Project—Valbonne, France (Sep. 2011).
Schmidt et al.,"Distributed Resource Allocation Schemes," IEEE Signal Processing Magazine, vol. 26, pp. 53-63, Institute of Electrical and Electronics Engineers—New York, New York (2009).
Candes et al., "Robust Uncertainty Principles: Exact Signal Reconstruction From Highly Incomplete Frequency Information," IEEE Transactions on Information Theory, vol. 52, pp. 489-509, Institute of Electrical and Electronics Engineers—New York, New York (Feb. 2006).
Donoho et al, "Stable Recovery of Sparse Overcomplete Representations in the Presence of Noise," IEEE Transactions on Information Theory, vol. 52, pp. 6-18, Institute of Electrical and Electronics Engineers—New York, New York (Jan. 2006).
Meng et al.,"Sparse Event Detection in Wireless Sensor Networks using Compressive Sensing," 43rd Annual Conference on CISS, pp. 1-5 (2009).
Schepker, "Sparse Multi-User Detection for CDMA Transmission Using Greedy Algorithms," 8th International Symposium on Wireless Communication Systems (ISWCS), pp. 1-5 (2011).
Ling et al, "Decentralized Sparse Signal Recovery for Compressive Sleeping Wireless Sensor Networks," IEEE Transactions on Signal Processing, vol. 58, pp. 3816-3827, Institute of Electrical and Electronics Engineers—New York, New York (2010).
Tropp et al., "Signal Recovery From Random Measurements Via Orthogonal Matching Pursuit," IEEE Transactions on Information Theory, vol. 53, pp. 4655-4666, Institute of Electrical and Electronics Engineers—New York, New York (Dec. 2007).
Blumensath et al, "Iterative hard thresholding for compressed sensing," Applied and Computational Harmonic Analysis, vol. 27, No. 3, pp. 265-274 (2009).
E.N.S. Cachan et al., "Congestion control in the context of Machine Type Communications in 3GPP LTE Networks," Evolution,Rennes, pp. 1-16 (Jan. 2011).
Jung et al, "Machine-Type-Communication (MTC) Device Grouping Algorithm for Congestion Avoidance of MTC Oriented LTE Network," Communications in Computer and Information Science, pp. 1-12 (Mar. 2010).
Sesia et al.,"LTE: The UMTS Long Term Evolution" John Wiley & Sons, Ltd, pp. 1-778 (2011).
"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.2.0, pp. 1-33, 3rd Generation Partnership Project—Valbonne, France (May 2008).
"Downlink Control Signaling for Rel. 11 CoMP", 3GPP TSG RAN WG1 Meeting #71, R1-124839, New Orleans, USA, XP50662822, pp. 1-4, 3rd Generation Partnership Project—Valbonne, France (Nov. 12-16, 2012).
"Rel-14 SID proposal: Further enhancements to CoMP operation," 3GPP TSG RAN Meeting #71, Göteborg, Sweden, RP-160430, pp. 1-5 (Mar. 7-10, 2016).
"New SID: Further enhancements to Coordinated Multi-Point Operation," 3GPP TSG RAN Meeting #71, Göteborg, Sweden, RP-160665, pp. 1-6 (Mar. 7-10, 2016).

\* cited by examiner

DATA TRANSMISSION METHOD, USER EQUIPMENT, AND NETWORK SIDE DEVICE

CROSS-REFERENCE TO RELATED APPLICATIONS

This application is a continuation of International Application No. PCT/CN2017/078211, filed on Mar. 24, 2017, which claims priority to Chinese Patent Application No. 201610257617.0, filed on Apr. 22, 2016. The disclosures of the aforementioned applications are hereby incorporated by reference in their entireties.

TECHNICAL FIELD

This application relates to the communications field, and in particular, to a data transmission method, user equipment, and a network side device.

BACKGROUND

In a Long Term Evolution (Long Term Evolution, LTE) network, a transmission mode (transmission mode, TM) 9 is introduced in the Release 10 (Rel-10). The TM 9 supports eight antenna ports in transmission of data and demodulation reference signal(s) (Demodulation Reference Signal, DM-RS). The eight antenna ports may be divided into two groups based on different time-frequency resources occupied by the DM-RSs sent by using the antenna ports. Four antenna ports in each group occupy same time-frequency resources to send DM-RSs by using code division. The group of antenna ports may be referred to as a DM-RS code division multiplexing (Code Division Multiplexing, CDM) group.

LTE supports multiple-input multiple-output (Multiple-Input Multiple-Output, MIMO) transmission, and supports simultaneous transmission of a maximum of eight data streams, but supports a maximum of two code words. Each code word is mapped to a maximum of four layers. In other words, each code word is corresponding to a maximum of four data streams. In addition, each code word has an independent modulation and coding scheme and an independent hybrid retransmission entity. For a mapping relationship among a code word, a layer, and an antenna port, when new data is transmitted, and a quantity k of physical downlink shared channel (Physical Downlink Shared Channel, PDSCH) layers is greater than 1, two code words are used, and antenna ports used by default are a port 7 to a port k+6. A code word 0 is mapped to a lower-digit port number, and a code word 1 is mapped to a higher-digit port number. In addition, when k is an even number, a quantity of layers to which the code word 0 is mapped is the same as a quantity of layers to which the code word 1 is mapped. When k is an odd number greater than 1, a quantity of layers to which the code word 1 is mapped is one more than a quantity of layers to which the code word 0 is mapped.

In the LTE Release 11 (Rel-11), an antenna port quasi-co-location (Quasi-Co-Location, QCL) concept is introduced to support coordinated multipoint transmission/reception (Coordinated Multipoint Transmission/Reception, CoMP), that is, to enable user equipment to receive a physical downlink control channel (Physical Downlink Control Channel, PDCCH) from a service network side device and receive a PDSCH from the service network side device or a coordinated network side device. Signals sent from quasi-co-located antenna ports undergo same large-scale fading. The large-scale fading includes a delay spread, a Doppler spread, a Doppler frequency shift, an average channel gain, and an average delay. Antenna ports that meet a quasi-co-location requirement may transmit data to the user equipment based on the mapping relationship among a code word, a layer, and an antenna port in the prior art. However, antenna ports at different locations do not meet a quasi-co-location requirement. For example, for a network side device 1 and a network side device 2 located at different locations, an antenna port set corresponding to a demodulation reference signal from the network side device 1 is A1, and an antenna port set corresponding to a demodulation reference signal from the network side device 2 is A2. An antenna in A1 and an antenna in A2 do not meet the quasi-co-location requirement. Consequently, DM-RS orthogonality is damaged, and channel estimation precision and demodulation performance are accordingly affected. As a result, different antenna ports in A1 and A2 cannot simultaneously send data to a same user.

SUMMARY

This application provides a data transmission method, user equipment, and a network side device, so that the user equipment can simultaneously receive different data streams sent by two network side devices.

According to a first aspect, a coordinated multipoint transmission/reception method is provided, where the method includes: receiving, in a subframe, first data and first demodulation reference signal(s) that are sent by a first network side device by using n antenna port(s); receiving, in the subframe, second data and second demodulation reference signal(s) that are sent by a second network side device by using m antenna port(s), where time-frequency resources occupied by the n antenna port(s) to send the first demodulation reference signal(s) are different from time-frequency resources occupied by the m antenna port(s) to send the second demodulation reference signal(s), n and m are positive integers, and a time-frequency resource occupied by the first data and that occupied by the second data at least partly overlap; and performing demodulation processing on the first data and/or the second data based on the first demodulation reference signal(s) and the second demodulation reference signal(s).

According to the coordinated multipoint transmission/reception method in this application, different network side devices may send data and demodulation reference signal(s) to same user equipment by using different antenna ports. The coordinated multipoint transmission/reception method may be applied to coordinated multipoint transmission/reception in which a plurality of network side devices that are not quasi-co-located simultaneously send data to the user equipment. For a problem that there are different frequency offsets when the signals sent by the different network side devices arrive at the user equipment, the user equipment may provide independent frequency offset compensation, and ensure orthogonality between demodulation reference signal(s) from the plurality of network side devices.

It should be understood that, that the user equipment receives the data and the demodulation reference signal(s) sent by the first network side device and those sent by the second network side device means that the user equipment may receive data and demodulation reference signal(s) sent by at least two network side devices. The first network side device and the second network side device may be any two of the at least two network side devices, or may be any plurality of network side devices.

In another implementation, n and m may also be zero, but not be zero at the same time. When either of n and m is zero, it may indicate that the user equipment receives a demodulation reference signal sent by one network side device.

It should be understood that, for the first demodulation reference signal(s) sent by the first network side device and the second demodulation reference signal(s) sent by the second network side device, the demodulation reference signal herein is a DM-RS, and is a known signal used to demodulate a data channel and/or a control channel. The demodulation reference signal has a specific association relationship with a corresponding data channel and/or control channel. For example, in LTE, a demodulation reference signal associated with a PDSCH uses a same transmit port, is corresponding to a same quantity of transmission layers, and occupies a same physical resource block (Physical Resource Block, PRB) as the PDSCH. In addition, a channel corresponding to the PDSCH associated with the demodulation reference signal may be estimated by using the demodulation reference signal, so as to demodulate the PDSCH.

Optionally, the first demodulation reference signal(s) sent by the first network side device by using different antenna ports in the n antenna port(s) may occupy same time-frequency resources, or may occupy different time-frequency resources. Likewise, the second demodulation reference signal(s) sent by the second network side device by using different antenna ports in the m antenna port(s) may occupy same time-frequency resources, or may occupy different time-frequency resources. However, the time-frequency resources occupied by the first demodulation reference signal(s) sent by using the n antenna port(s) are certainly different from the time-frequency resources occupied by the second demodulation reference signal(s) sent by using the m antenna port(s).

It should be understood that, that the time-frequency resources occupied by the first demodulation reference signal(s) are different from the time-frequency resources occupied by the second demodulation reference signal(s) may include: Time domain resources are the same but frequency domain resources are different; frequency domain resources are the same but time domain resources are different; and time domain resources are different and frequency domain resources are different.

It should be understood that, the performing demodulation processing on the first data and/or the second data based on the first demodulation reference signal(s) and the second demodulation reference signal(s) includes: performing demodulation processing on the first data based on the first demodulation reference signal(s); and/or performing demodulation processing on the second data based on the second demodulation reference signal(s); and/or performing joint demodulation processing on the first data and the second data based on the first demodulation reference signal(s) and the second demodulation reference signal(s).

With reference to the first aspect and the foregoing implementation of the first aspect, in another implementation of the first aspect, the first data is obtained by performing layer mapping and precoding processing on a first code word by the first network side device, and the first code word is obtained by performing modulation and coding processing on first original data by the first network side device by using a first modulation and coding scheme; and the second data is obtained by performing layer mapping and precoding processing on a second code word by the second network side device, and the second code word is obtained by performing modulation and coding processing on second original data by the second network side device by using a second modulation and coding scheme.

It should be understood that the first code word of the first network side device may be the same as or different from the second code word of the second network side device. When the first code word is the same as the second code word, for example, in a multipoint diversity transmission scenario, content of the first data sent by the first network side device is the same as that of the second data sent by the second network side device, and encoding may be performed by using a same modulation and coding scheme, to obtain the first data and the second data that are the same. When the first code word is different from the second code word, for example, in a multipoint multi-stream transmission scenario, content of the first data sent by the first network side device is different from that of the second data sent by the second network side device, and the first modulation and coding scheme used by the first network side device may be different from the second modulation and coding scheme used by the second network side device, to obtain the first data and the second data that are different.

With reference to the first aspect and the foregoing implementations of the first aspect, in another implementation of the first aspect, the method further includes: receiving second indication information sent by the first network side device, where the second indication information indicates a quantity n of transmission layers for the first code word and/or a quantity m of transmission layers for the second code word.

It may be understood that, a sum of the quantity n of transmission layers for the first code word and the quantity m of transmission layers for the second code word is a value of a rank indicator RI. When learning of a value of n or m, the user equipment may learn of the other value based on the value of the RI.

It should be understood that the first network side device transmits the first data and the first demodulation reference signal(s) by using the n antenna port(s). The n antenna port(s) are corresponding to n transmission layers. Likewise, the second network side device transmits the second data and the second demodulation reference signal(s) by using the m antenna port(s). The m antenna port(s) are corresponding to m transmission layers. The user equipment may obtain specific values of n and m by receiving second indication information sent by a service network side device.

Optionally, the user equipment may receive the second indication information sent by the first network side device or the second network side device. Specifically, the user equipment receives the second indication information sent by the service network side device. The service network side device may be the first network side device or the second network side device.

It should be understood that the second indication information may be sent by the service network side device by using physical layer control signaling, or may be sent by using higher layer signaling.

It should be understood that the user equipment may determine a total quantity of transmission layers of the first network side device and the second network side device. Therefore, the second indication information may include only the quantity n of transmission layers for the first code word of the first network side device, or include only the quantity m of transmission layers for the second code word of the second network side device. Then the other quantity of transmission layers that is not indicated in the second indication information is determined based on the total quantity of transmission layers.

With reference to the first aspect and the foregoing implementations of the first aspect, in another implementation of the first aspect, the first code word is mapped to a layer 0 to a layer n−1, the layer 0 to the layer n−1 are mapped to the first n antenna port(s) in a first antenna port set of the first network side device in order, the first n antenna port(s) are the n antenna port(s), antenna ports in the first antenna port set are arranged according to a preset rule, and n is less than or equal to a quantity of antenna ports in the first antenna port set; and the second code word is mapped to a layer n to a layer n+m−1, the layer n to the layer n+m−1 are mapped to the first m antenna port(s) in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

For example, the first code word is mapped to the layer 0 to the layer n−1. The layer 0 to the layer n−1 are mapped to the first n antenna port(s) in the first antenna port set of the first network side device in order. The first antenna port set includes antenna ports 7, 8, 11, and 13. In this case, the layer 0 to the layer n−1 are mapped to the first n antenna port(s) in the antenna ports 7, 8, 11, and 13 of the first network side device in order, where n is less than or equal to 4. Correspondingly, the second code word is mapped to the layer n to the layer n+m−1. The layer n to the layer n+m−1 are mapped to the first m antenna port(s) in the second antenna port set of the second network side device in order. The second antenna port set includes antenna ports 9, 10, 12, and 14. In this case, the layer n to the layer n+m−1 are mapped to the first m antenna port(s) in the antenna ports 9, 10, 12, and 14 of the second network side device in order, where m is less than or equal to 4.

With reference to the first aspect and the foregoing implementations of the first aspect, in another implementation of the first aspect, the method further includes:

before the user equipment receives the first demodulation reference signal(s) sent by the first network side device and the second demodulation reference signal(s) sent by the second network side device, receiving, by the user equipment, a configuration message sent by the first network side device or the second network side device, where the configuration message includes antenna port group information used to send a demodulation reference signal and a corresponding data signal, and the antenna port group information includes CDM group number information.

Optionally, the antenna port group may be the first antenna port set and/or the second antenna port set.

Optionally, CDM groups are numbered, and the configuration message may indicate a CDM group number included in each piece of antenna port group information.

Optionally, the configuration message may be sent by using a higher layer message such as an RRC message or a Media Access Control control element (MAC CE) message, or may be sent by using a physical layer control message.

With reference to the first aspect and the foregoing implementations of the first aspect, in another implementation of the first aspect, the method further includes: receiving first indication information, where the first indication information indicates the time-frequency resource occupied by the first data sent by the first network side device and the time-frequency resource occupied by the second data sent by the second network side device.

It should be understood that the first indication information may be sent by using physical layer control signaling, or may be sent by using higher layer signaling. When the first indication information is sent by using the physical layer control signaling, the first indication information may be resource configuration information in the prior art, or may not be the resource configuration information.

Optionally, the first indication information may include a plurality of indication fields that separately indicate the time-frequency resource occupied by the first data sent by the first network side device and that occupied by the second data sent by the second network side device, but overheads are relatively large. Therefore, both the time-frequency resource occupied by the data sent by the first network side device and that occupied by the data sent by the second network side device may be indicated by using a same indication field.

Optionally, the user equipment may receive the first indication information sent by the first network side device or the second network side device. Specifically, the user equipment receives the first indication information sent by the service network side device. The service network side device may be the first network side device or the second network side device.

Optionally, the user equipment receives the first indication information and the second indication information, where the first indication information and the second indication information may be indicated by using different indication fields in a same message, or the first indication information and the second indication information are separately sent by using two different messages.

With reference to the first aspect and the foregoing implementations of the first aspect, in another implementation of the first aspect, the first indication information may further include a silence indication field, where the silence indication field is used to indicate that the first data sent by the first network side device does not occupy a first resource element RE, and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s); or the silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s).

Optionally, the silence indication field may be further used to indicate to the user equipment that there is no unoccupied RE. The first network side device and the second network side device may perform rate matching on some REs, and does not send data on the REs on which rate matching is performed. Likewise, the first network side device and the second network side device may not perform rate matching on any RE, that is, indicate to the user equipment by using the silence indication field that there is no RE on which rate matching is performed.

It should be understood that when the first indication information is resource configuration information in the prior art, a new indication field may be added to the resource configuration information as the silence indication field, or a field in the resource configuration information may be reused as the silence indication field.

It should be understood that, that the silence indication field indicates that the data does not occupy an RE may be a semi-static process. To be specific, an indication may not be given in each subframe by using the silence indication field, but may be given by sending the first indication information once. The indication may last for a time period. RE occupation statuses in all subframes sent within the time period are based on the silence indication field in the first indication information. Silence processing is performed on an RE in a symbol preceding or following each of the demodulation reference signal(s) sent by the different network side devices, that is, rate matching is performed on the RE to avoid data transmission, so that when a time difference between moments at which the signals from the different network side devices arrive at the user equipment is relatively large, silence processing may be performed to further ensure the orthogonality between the demodulation reference signal(s) sent by the plurality of network side devices. Therefore, interference between a data symbol and the demodulation reference signal is reduced.

With reference to the first aspect and the foregoing implementations of the first aspect, in another implementation of the first aspect, the first indication information may be further used to indicate an antenna port group that is used by the first network side device and that is configured by using a network side configuration message, and/or an antenna port group that is used by the second network side device and that is configured by using a network side configuration message.

Optionally, the first indication information may explicitly indicate antenna port group information used by the first network side device and/or antenna port group information used by the second network side device.

Optionally, the first indication information may implicitly indicate the antenna port group used by the first network side device and/or that used by the second network side device. For example, the antenna port group used by the first network side device and/or that used by the second network side device may be implicitly indicated in an antenna port grouping order indicated in an antenna port configuration message sent by a service network side device.

With reference to the first aspect and the foregoing implementations of the first aspect, in another implementation of the first aspect, the first indication information may be further used to indicate QCL information corresponding to the antenna port group used by the first network side device and/or QCL information corresponding to the antenna port group used by the second network side device, where the QCL information indicates that a currently used antenna port group and an antenna port used for a configured resource meet a QCL relationship.

Optionally, the network side device may preconfigure a plurality of groups of resource information for the user equipment. The resource information may include one or more pieces of resource information such as resource information corresponding to a channel state information reference signal CSI-RS, an identifier (ID) used to identify the resource information, resource information corresponding to a cell-level reference signal, an ID corresponding to the resource information, synchronization channel resource information used for synchronization, resource information used to identify a spatial resource such as a beam, and resource information corresponding to a mobility reference signal MRS used for mobility management.

Optionally, each of the plurality of groups of resource information may be corresponding to one group number. A QCL relationship between the currently used antenna port group and resource information corresponding to the group may be indicated, to assist the user equipment in jointly performing channel estimation and signal demodulation by jointly using a DMRS sent by a currently used antenna port and the resource information corresponding to the group, so as to improve demodulation performance.

According to a second aspect, a coordinated multipoint transmission/reception method is provided, where the method includes: sending, by a first network side device, first data and first demodulation reference signal(s) to user equipment in a subframe by using n antenna port(s), where the subframe is used by a second network side device to send second data and second demodulation reference signal(s) to the user equipment by using m antenna port(s), time-frequency resources occupied by the m antenna port(s) to send the second demodulation reference signal(s) do not carry time-frequency resources occupied by the n antenna port(s) to send the first demodulation reference signal(s), n and m are positive integers, at least a part of a time-frequency resource occupied by the first data also carries the second data, and the first demodulation reference signal(s) and the second demodulation reference signal(s) are used by the user equipment to perform demodulation processing on the first data and/or the second data.

According to the coordinated multipoint transmission/reception method in this application, different network side devices send demodulation reference signal(s) to same user equipment by using different antenna ports. The coordinated multipoint transmission/reception method may be applied to coordinated multipoint transmission/reception in which a plurality of network side devices that are not quasi-co-located simultaneously send data to the user equipment. For a problem that there are different frequency offsets when the signals sent by the different network side devices arrive at the user equipment, the user equipment may provide independent frequency offset compensation, and ensure orthogonality between demodulation reference signal(s) from the plurality of network side devices.

It should be understood that, that the user equipment receives the demodulation reference signal(s) sent by the first network side device and those sent by the second network side device means that the user equipment may receive demodulation reference signal(s) sent by at least two network side devices. The first network side device and the second network side device may be any two of the at least two network side devices, or may be any plurality of network side devices.

Optionally, the first demodulation reference signal(s) sent by the first network side device by using different antenna ports in the n antenna port(s) may occupy same time-frequency resources, or may occupy different time-frequency resources. Likewise, the second demodulation reference signal(s) sent by the second network side device by using different antenna ports in the m antenna port(s) may occupy same time-frequency resources, or may occupy different time-frequency resources. However, the time-frequency resources occupied by the first demodulation reference signal(s) sent by using the n antenna port(s) are certainly different from the time-frequency resources occupied by the second demodulation reference signal(s) sent by using the m antenna port(s).

It should be understood that, that the time-frequency resources occupied by the first demodulation reference signal(s) are different from the time-frequency resources occupied by the second demodulation reference signal(s) may include: Time domain resources are the same but frequency domain resources are different; frequency domain resources are the same but time domain resources are different; and time domain resources are different and frequency domain resources are different.

It should be understood that the user equipment may perform demodulation processing on the first data and/or the second data based on the first demodulation reference signal(s) and the second demodulation reference signal(s). Specifically, the user equipment may perform demodulation processing on the first data based on the first demodulation reference signal(s), and/or perform demodulation processing on the second data based on the second demodulation reference signal(s), and/or perform joint demodulation processing on the first data and the second data based on the first demodulation reference signal(s) and the second demodulation reference signal(s).

With reference to the second aspect and the foregoing implementation of the second aspect, in another implementation of the second aspect, the method further includes: performing, by the first network side device, modulation and coding processing on first original data by using a first modulation and coding scheme, to obtain a first code word; and performing, by the first network side device, layer mapping and precoding processing on the first code word to obtain the first data.

Correspondingly, the second network side device performs modulation and coding processing on second original data by using a second modulation and coding scheme, to obtain a second code word; and the second network side device performs layer mapping and precoding processing on the second code word to obtain the second data.

It should be understood that the first code word of the first network side device may be the same as or different from the second code word of the second network side device. When the first code word is the same as the second code word, for example, in a multipoint diversity transmission scenario, content of the first data sent by the first network side device is the same as that of the second data sent by the second network side device, and encoding may be performed by using a same modulation and coding scheme, to obtain the first data and the second data that are the same. When the first code word is different from the second code word, for example, in a multipoint multi-stream transmission scenario, content of the first data sent by the first network side device is different from that of the second data sent by the second network side device, and the first modulation and coding scheme used by the first network side device may be different from the second modulation and coding scheme used by the second network side device, to obtain the first data and the second data that are different.

With reference to the second aspect and the foregoing implementations of the second aspect, in another implementation of the second aspect, the method further includes: sending third indication information to the user equipment, where the third indication information indicates a quantity n of transmission layers for the first code word and/or a quantity m of transmission layers for the second code word.

It may be understood that, a sum of the quantity n of transmission layers for the first code word and the quantity m of transmission layers for the second code word is a value of a rank RI. When learning of a value of n or m, the user equipment may learn of the other value based on the value of the RI. Therefore, the user equipment may determine a total quantity RI of transmission layers of the first network side device and the second network side device. Therefore, the third indication information may include only the quantity n of transmission layers for the first code word of the first network side device, or include only the quantity m of transmission layers for the second code word of the second network side device. Then the user equipment determines, based on the total quantity of transmission layers, the other quantity of transmission layers that is not indicated in the third indication information.

Optionally, when the first network side device is a service network side device, the first network side device sends the third indication information to the user equipment.

It should be understood that the third indication information may be sent by the first network side device by using physical layer control signaling, or may be sent by using higher layer signaling.

With reference to the second aspect and the foregoing implementations of the second aspect, in another implementation of the second aspect, the first code word is mapped to a layer 0 to a layer n−1, the layer 0 to the layer n−1 are mapped to the first n antenna port(s) in a first antenna port set of the first network side device in order, the first n antenna port(s) are the n antenna port(s), antenna ports in the first antenna port set are arranged according to a preset rule, and n is less than or equal to a quantity of antenna ports in the first antenna port set; and the second code word is mapped to a layer n to a layer n+m−1, the layer n to the layer n+m−1 are mapped to the first m ports in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

For example, the first code word is mapped to the layer 0 to the layer n−1, and the layer 0 to the layer n−1 are mapped to the first n antenna port(s) in antenna ports 7, 8, 11, and 13 of the first network side device in order, where n is less than or equal to 4. Correspondingly, the second code word is mapped to the layer n to the layer n+m−1, and the layer n to the layer n+m−1 are mapped to the first m antenna port(s) in antenna ports 9, 10, 12, and 14 of the second network side device in order, where m is less than or equal to 4.

With reference to the second aspect and the foregoing implementations of the second aspect, in another implementation of the second aspect, the method further includes: before the first network side device and the second network side device send the first demodulation reference signal(s) and the second demodulation reference signal(s) to the user equipment, sending, by the first network side device or the second network side device, a configuration message to the user equipment, where the configuration message includes antenna port group information used to send a demodulation reference signal and a corresponding data signal, and the antenna port group information includes CDM group number information.

Optionally, the antenna port group may be the first antenna port set and/or the second antenna port set.

Optionally, CDM groups are numbered, and the configuration message may indicate a CDM group number included in each piece of antenna port group information.

Optionally, the configuration message may be sent by using a higher layer message such as an RRC message or a Media Access Control control element (MAC CE) message, or may be sent by using a physical layer control message.

With reference to the second aspect and the foregoing implementations of the second aspect, in another implementation of the second aspect, the method further includes: sending, by the first network side device, first indication information to the user equipment, where the first indication information indicates the time-frequency resource occupied by the first data sent by the first network side device and a time-frequency resource occupied by the second data sent by the second network side device, and the second data is sent by the second network side device to the user equipment in the subframe by using the m antenna port(s).

Optionally, when the first network side device is a service network side device, the first network side device may send the first indication information to the user equipment. The first indication information may be sent by using physical layer control signaling, or may be sent by using higher layer signaling. When the first indication information is sent by using the physical layer control signaling, the first indication information may be resource configuration information in the prior art, or may not be the resource configuration information.

Optionally, the first indication information may include a plurality of indication fields that separately indicate the time-frequency resource occupied by the first data sent by the first network side device and that occupied by the second data sent by the second network side device, but overheads are relatively large. Therefore, both the time-frequency resource occupied by the data sent by the first network side device and that occupied by the data sent by the second network side device may be indicated by using a same indication field.

Optionally, the first network side device sends the first indication information and the third indication information, where the first indication information and the third indication information may be indicated by using different indication fields in a same message, or the first indication information and the third indication information are separately sent by using two different messages.

With reference to the second aspect and the foregoing implementations of the second aspect, in another implementation of the second aspect, the first indication information further includes a first silence indication field, where the first silence indication field is used to indicate that the first data sent by the first network side device does not occupy a first resource element RE, and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s).

With reference to the second aspect and the foregoing implementations of the second aspect, in another implementation of the second aspect, the first indication information may further indicate an antenna port group that is used by the first network side device and that is configured by using a network side configuration message, and/or an antenna port group that is used by the second network side device and that is configured by using a network side configuration message.

Optionally, the first indication information may explicitly indicate antenna port group information used by the first network side device and/or antenna port group information used by the second network side device.

Optionally, the first indication information may implicitly indicate the antenna port group used by the first network side device and/or that used by the second network side device. For example, the antenna port group used by the first network side device and/or that used by the second network side device may be implicitly indicated in an antenna port grouping order indicated in an antenna port configuration message sent by a service network side device.

With reference to the second aspect and the foregoing implementations of the second aspect, in another implementation of the second aspect, the first indication information may be further used to indicate QCL information corresponding to the antenna port group used by the first network side device and/or QCL information corresponding to the antenna port group used by the second network side device, where the QCL information indicates that a currently used antenna port group and an antenna port used for a configured resource meet a QCL relationship.

Optionally, the network side device may preconfigure a plurality of groups of resource information for the user equipment. The resource information may include one or more pieces of resource information such as resource information corresponding to a channel state information reference signal CSI-RS, an identifier (ID) used to identify the resource information, resource information corresponding to a cell-level reference signal, an ID corresponding to the resource information, synchronization channel resource information used for synchronization, resource information used to identify a spatial resource such as a beam, and resource information corresponding to a mobility reference signal MRS used for mobility management.

Optionally, each of the plurality of groups of resource information may be corresponding to one group number. A QCL relationship between the currently used antenna port group and resource information corresponding to the group may be indicated, to assist the user equipment in jointly performing channel estimation and signal demodulation by jointly using a DMRS sent by a currently used antenna port and the resource information corresponding to the group, so as to improve demodulation performance.

With reference to the second aspect and the foregoing implementations of the second aspect, in another implementation of the second aspect, the method further includes: determining, by the first network side device, the first indication information when a second moment at which a signal sent by the first network side device at a first moment arrives at the user equipment is later than a third moment at which a signal sent by the second network side device at the first moment arrives at the user equipment, and when a time difference between the second moment and the third moment is greater than or equal to a preset time period, where the first indication information includes the first silence indication field; the first silence indication field is used to indicate that the first data sent by the first network side device does not occupy the first resource element RE, and that the second data sent by the second network side device does not occupy the second RE; the RE that is in the symbol following the first RE and that is at the same frequency domain resource location as the first RE is used to carry the second demodulation reference signal(s); and the RE that is in the symbol preceding the second RE and that is at the same frequency domain resource location as the second RE is used to carry the first demodulation reference signal(s).

With reference to the second aspect and the foregoing implementations of the second aspect, in another implementation of the second aspect, the method further includes: sending, by the first network side device, second indication information to the second network side device, where the second indication information includes a second silence indication field, the second silence indication field is used to indicate that the second data sent by the second network side device does not occupy the second RE, and the RE that is in the symbol preceding the second RE and that is at the same frequency domain resource location as the second RE is used to carry the first demodulation reference signal(s).

With reference to the second aspect and the foregoing implementations of the second aspect, in another implementation of the second aspect, the first indication information further includes a first silence indication field; the first silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s).

With reference to the second aspect and the foregoing implementations of the second aspect, in another implementation of the second aspect, the method further includes: determining, by the first network side device, the first indication information when a second moment at which a signal sent by the first network side device at a first moment arrives at the user equipment is earlier than a third moment at which a signal sent by the second network side device at the first moment arrives at the user equipment, and when a time difference between the second moment and the third moment is greater than or equal to a preset time period, where the first indication information includes a third silence indication field; the third silence indication field is used to indicate that the first data sent by the first network side device does not occupy the third RE, and that the second data sent by the second network side device does not occupy the fourth RE; the RE that is in the symbol preceding the third RE and that is at the same frequency domain resource location as the third RE is used to carry the second demodulation reference signal(s); and the RE that is in the symbol following the fourth RE and that is at the same frequency domain resource location as the fourth RE is used to carry the first demodulation reference signal(s).

With reference to the second aspect and the foregoing implementations of the second aspect, in another implementation of the second aspect, the method further includes: sending, by the first network side device, second indication information to the second network side device, where the second indication information includes a fourth silence indication field, the fourth silence indication field is used to indicate that the second data sent by the second network side device does not occupy the fourth RE, and the RE that is in the symbol following the fourth RE and that is at the same frequency domain resource location as the fourth RE is used to carry the first demodulation reference signal(s).

With reference to the second aspect and the foregoing implementations of the second aspect, in another implementation of the second aspect, the first indication information further includes a first silence indication field, and the first silence indication field is used to indicate that there is no unoccupied RE for the first network side device and the second network side device.

Optionally, the first data does not occupy the first RE and the second data does not occupy the second RE, or the first data does not occupy the third RE and the second data does not occupy the fourth RE. The RE herein that is not occupied by the data is a silent RE. The silent RE is processed in the following two manners:

One manner is as follows: For data on which encoding, modulation, and precoding processing are performed, when resource mapping is performed, data mapped to the silent RE is directly deleted, that is, the data on the corresponding RE is not to be sent. Correspondingly, when calculating an available RE for data transmission, the network side device does not remove the silent RE. In other words, the silent RE is still used as a valid RE to calculate a volume of data that can be transmitted.

The other manner is as follows: For data on which encoding, modulation, and precoding processing are performed, when resource mapping is performed, the silent RE is not matched, that is, the data is not to be mapped to the silent RE. Correspondingly, when calculating an available RE for data transmission, the network side device removes the silent RE. In other words, the silent RE is not used as a valid RE to calculate a volume of data that can be transmitted.

Optionally, if there is no RE on which silent processing is performed for the data sent by the first network side device and the second network side device, the first silence indication field in the first indication information sent to the user equipment may also be used to indicate to the user equipment that there is no RE on which silent processing is performed. In other words, the first network side device and the second network side device do not perform rate matching on any RE.

Silence processing is performed on an RE in a symbol preceding or following each of the demodulation reference signal(s) sent by the different network side devices, that is, rate matching is performed on the RE to avoid data transmission, so that when a time difference between moments at which the signals from the different network side devices arrive at the user equipment is relatively large, silence processing may be performed to further ensure the orthogonality between the demodulation reference signal(s) sent by the plurality of network side devices. Therefore, interference between a data symbol and the demodulation reference signal is reduced.

According to a third aspect, a data transmission method is provided, where the method includes: generating a subframe, where in the subframe, a cyclic prefix CP length of a time domain symbol used to carry a demodulation reference signal is greater than a CP length of a time domain symbol used to carry data; and sending the subframe to user equipment.

According to the data transmission method in this application, the data and the demodulation reference signal are carried by using the subframe; and in the subframe, the CP length of the symbol that carries the data is less than the CP length of the symbol that carries the demodulation reference signal, so that inter-symbol interference can be reduced.

With reference to the third aspect, in an implementation of the third aspect, in the subframe, a CP length of each time domain symbol used to carry a demodulation reference signal is greater than a CP length of each time domain symbol used to carry data.

With reference to the third aspect, in an implementation of the third aspect, a first network side device sends first data and first demodulation reference signal(s) to the user equipment in the subframe by using n antenna port(s), and a second network side device sends second data and second demodulation reference signal(s) to the user equipment in the subframe by using m antenna port(s), where n and m are positive integers, a time-frequency resource occupied by the first data and that occupied by the second data at least partly overlap, and the first demodulation reference signal(s) and the second demodulation reference signal(s) are used by the user equipment to perform demodulation processing on the first data and/or the second data.

In this way, if a plurality of network side devices send data and demodulation reference signal(s) to the same user equipment, a time difference between moments at which the demodulation reference signal(s) sent by the plurality of network side devices arrive at the UE may be greater than an existing CP length of the demodulation reference signal. Therefore, the CP length of the demodulation reference signal is increased, so that orthogonality between the demodulation reference signal(s) can be ensured, interference between the demodulation reference signal(s) and that between a data symbol and the demodulation reference signal can be reduced, and channel estimation precision and data demodulation performance can be improved. With reference to the third aspect and the foregoing implementations of the third aspect, in another implementation of the third aspect, in the subframe, the CP length of the time domain symbol used to carry the demodulation reference signal is double the CP length of the time domain symbol used to carry the data.

With reference to the third aspect and the foregoing implementations of the third aspect, in another implementation of the third aspect, in the subframe, a subcarrier spacing for the time domain symbol used to carry the user equipment-level demodulation reference signal is different from a subcarrier spacing for the time domain symbol used to carry the data.

For example, when in the subframe, the CP length of the time domain symbol used to carry the demodulation reference signal is double the CP length of the time domain symbol used to carry the data, the subcarrier spacing for the time domain symbol used to carry the user equipment-level demodulation reference signal is half of the subcarrier spacing for the time domain symbol used to carry the data.

With reference to the third aspect and the foregoing implementations of the third aspect, in another implementation of the third aspect, in the subframe, a CP length of a time domain symbol used to carry a channel measurement reference signal CSI-RS is greater than the CP length of the time domain symbol used to carry the data. Optionally, in the subframe, a CP length of each time domain symbol used to carry a channel measurement reference signal CSI-RS is greater than the CP length of each time domain symbol used to carry the data.

It may be understood that the method provided in the third aspect may be implemented independently of the method provided in the second aspect, or may be combined with the method provided in the second aspect as required. Details are not described herein.

According to a fourth aspect, a data transmission method is provided, where the method includes: receiving a subframe sent by a network side device, where in the subframe, a cyclic prefix CP length of a time domain symbol used to carry a demodulation reference signal is greater than a CP length of a time domain symbol used to carry data; and performing demodulation processing on the data based on the demodulation reference signal.

According to the data transmission method in this application, the data and the demodulation reference signal are carried by using the subframe; and in the subframe, the CP length of the symbol that carries the data is less than the CP length of the symbol that carries the demodulation reference signal, so that inter-symbol interference can be reduced.

With reference to the fourth aspect, in an implementation of the fourth aspect, in the subframe, a CP length of each time domain symbol used to carry a demodulation reference signal is greater than a CP length of each time domain symbol used to carry data.

With reference to the fourth aspect and the foregoing implementations of the fourth aspect, in another implementation of the fourth aspect, user equipment receives, in the subframe, first data and first demodulation reference signal(s) that are sent by a first network side device by using n antenna port(s), and second data and second demodulation reference signal(s) that are sent by a second network side device by using m antenna port(s), where n and m are positive integers, and a time-frequency resource occupied by the first data and that occupied by the second data at least partly overlap; and the user equipment performs demodulation processing on the first data and/or the second data based on the first demodulation reference signal(s) and the second demodulation reference signal(s).

In this way, if same user equipment receives data and demodulation reference signal(s) that are sent by a plurality of network side devices, a time difference between moments at which the demodulation reference signal(s) sent by the plurality of network side devices arrive at the UE may be greater than an existing CP length of the demodulation reference signal. Therefore, the CP length of the demodulation reference signal is increased, so that orthogonality between the demodulation reference signal(s) can be ensured, interference between the demodulation reference signal(s) and that between a data symbol and the demodulation reference signal can be reduced, and channel estimation precision and data demodulation performance can be improved.

With reference to the fourth aspect and the foregoing implementations of the fourth aspect, in another implementation of the fourth aspect, in the subframe, the CP length of the time domain symbol used to carry the demodulation reference signal is double the CP length of the time domain symbol used to carry the data.

With reference to the fourth aspect and the foregoing implementations of the fourth aspect, in another implementation of the fourth aspect, in the subframe, a subcarrier spacing for the time domain symbol used to carry the user equipment-level demodulation reference signal is different from a subcarrier spacing for the time domain symbol used to carry the data.

With reference to the fourth aspect and the foregoing implementations of the fourth aspect, in another implementation of the fourth aspect, in the subframe, a CP length of a time domain symbol used to carry a channel measurement reference signal CSI-RS is greater than the CP length of the time domain symbol used to carry the data. Optionally, in the subframe, a CP length of each time domain symbol used to carry a channel measurement reference signal CSI-RS is greater than the CP length of each time domain symbol used to carry the data.

It may be understood that the method provided in the fourth aspect may be implemented independently of the method provided in the first aspect, or may be combined with the method provided in the first aspect as required. Details are not described herein.

According to a fifth aspect, user equipment is provided, and is configured to perform the method in the first aspect or any possible implementation of the first aspect. Specifically, the user equipment includes a unit configured to perform the method in the first aspect or any possible implementation of the first aspect.

According to a sixth aspect, a network side device is provided, and is configured to perform the method in the second aspect or any possible implementation of the second aspect. Specifically, the network side device includes a unit configured to perform the method in the second aspect or any possible implementation of the second aspect.

According to a seventh aspect, a network side device is provided, and is configured to perform the method in the third aspect or any possible implementation of the third aspect. Specifically, the network side device includes a unit configured to perform the method in the third aspect or any possible implementation of the third aspect.

According to an eighth aspect, user equipment is provided, and is configured to perform the method in the fourth aspect or any possible implementation of the fourth aspect. Specifically, the user equipment includes a unit configured to perform the method in the fourth aspect or any possible implementation of the fourth aspect.

According to a ninth aspect, user equipment is provided, including a memory and a processor, where the memory is configured to store an instruction, and the processor is configured to execute the instruction stored in the memory; and when the processor executes the instruction stored in the memory, the processor performs the method in the first aspect or any possible implementation of the first aspect.

According to a tenth aspect, a network side device is provided, including a memory and a processor, where the memory is configured to store an instruction, and the processor is configured to execute the instruction stored in the memory; and when the processor executes the instruction stored in the memory, the processor performs the method in the second aspect or any possible implementation of the second aspect.

According to an eleventh aspect, a network side device is provided, including a memory and a processor, where the memory is configured to store an instruction, and the processor is configured to execute the instruction stored in the memory; and when the processor executes the instruction stored in the memory, the processor performs the method in the third aspect or any possible implementation of the third aspect.

According to a twelfth aspect, user equipment is provided, including a memory and a processor, where the memory is configured to store an instruction, and the processor is configured to execute the instruction stored in the memory; and when the processor executes the instruction stored in the memory, the processor performs the method in the fourth aspect or any possible implementation of the fourth aspect.

According to a thirteenth aspect, a computer readable medium is provided, and is configured to store a computer program, where the computer program includes an instruction used to perform the method in the first aspect or any possible implementation of the first aspect.

According to a fourteenth aspect, a computer readable medium is provided, and is configured to store a computer program, where the computer program includes an instruction used to perform the method in the second aspect or any possible implementation of the second aspect.

According to a fifteenth aspect, a computer readable medium is provided, and is configured to store a computer program, where the computer program includes an instruction used to perform the method in the third aspect or any possible implementation of the third aspect.

According to a sixteenth aspect, a computer readable medium is provided, and is configured to store a computer program, where the computer program includes an instruction used to perform the method in the fourth aspect or any possible implementation of the fourth aspect.

DESCRIPTION OF EMBODIMENTS

The following describes technical solutions of this application with reference to the accompanying drawings in this application.

It should be understood that the technical solutions of this application may be applied to various communications systems, such as a Global System for Mobile Communications (Global System for Mobile Communications, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, a Long Term Evolution Advanced (Long Term Evolution Advanced, LTE-A) system, a Universal Mobile Telecommunications System (Universal Mobile Telecommunications System, UMTS), and a 5G system.

Figure 1:
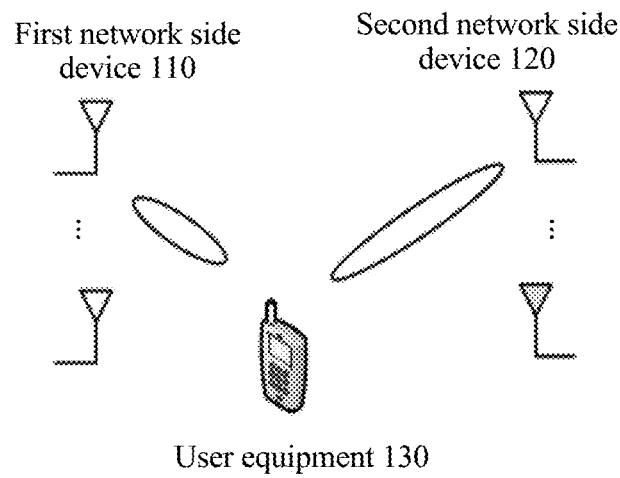
FIG. 1 is a schematic diagram of a wireless communications system according to this application.

FIG. 1 shows a wireless communications system 100 applied to this application. The wireless communications system 100 may include at least one network side device, such as two network side devices shown in FIG. 1: a first network side device 110 and a second network side device 120. The first network side device 110 and the second network side device 120 each may communicate with user equipment 130 by using a radio air interface. The first network side device 110 and the second network side device 120 each may provide communication coverage in a specific geographic area, and may communicate with user equipment located in the coverage area. The first network side device 110 or the second network side device 120 may be a base transceiver station (Base Transceiver Station, BTS) in a GSM system or a CDMA system, may be a NodeB (NodeB) in a WCDMA system, may be an evolved NodeB (Evolved NodeB, eNB or eNodeB) in an LTE system, or may be a network side device in a future 5G network, such as a transmission reception point (Transmission Reception Point, TRP), a base station, or a small cell device. This is not limited in this application. The network side devices in this application may be corresponding to non-QCL sites. The first network side device and the second network side device may be non-QCL sites that belong to a same base station, for example, radio frequency units of a same base station that are relatively far from each other in terms of geographic locations. Alternatively, the first network side device and the second network side device may be different base stations that meet non-QCL.

The wireless communications system 100 further includes one or more user equipments (User Equipment, UE) 130 located in the coverage area of the first network side device 110 and that of the second network side device 120. The user equipment 130 may be mobile or fixed. The user equipment 130 may communicate with one or more core networks (Core Network) by using a radio access network (Radio Access Network, RAN). The user equipment may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. The user equipment may be a cellular phone, a cordless telephone set, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network, and the like.

In the wireless communications system 100 shown in FIG. 1, the user equipment 130 supports multipoint transmission. To be specific, the user equipment 130 may communicate with the first network side device 110, and may also communicate with the second network side device 120. The first network side device 110 may serve as a service network side device. A service network side device is the network side device that provides services such as an RRC connection, non-access stratum (non-access stratum, NAS) mobility management, and security input for a terminal device by using the radio air interface protocol. The first network side device and the terminal device may communicate by using the air interface protocol. Optionally, when the first network side device 110 is a service network side device, the second network side device 120 may serve as a coordinated network side device to send data to the user equipment. Alternatively, if the first network side device is a coordinated network side device, the second network side device is a service network side device. This application is not limited thereto. For example, the first network side device is a service network side device, and the second network side device is a coordinated network side device. There may be one or more second network side devices, and the second network side device and the first network side device are network side devices that meet different QCLs. Usually, the second network side device and the first network side device are located at different geographic locations. Usually, the second network side device is a neighboring network side device of the first network side device. It may be understood that, both the first network side device and the second network side device may be service network side devices, for example, in a non-cell (non-cell) scenario.

Figure 2:
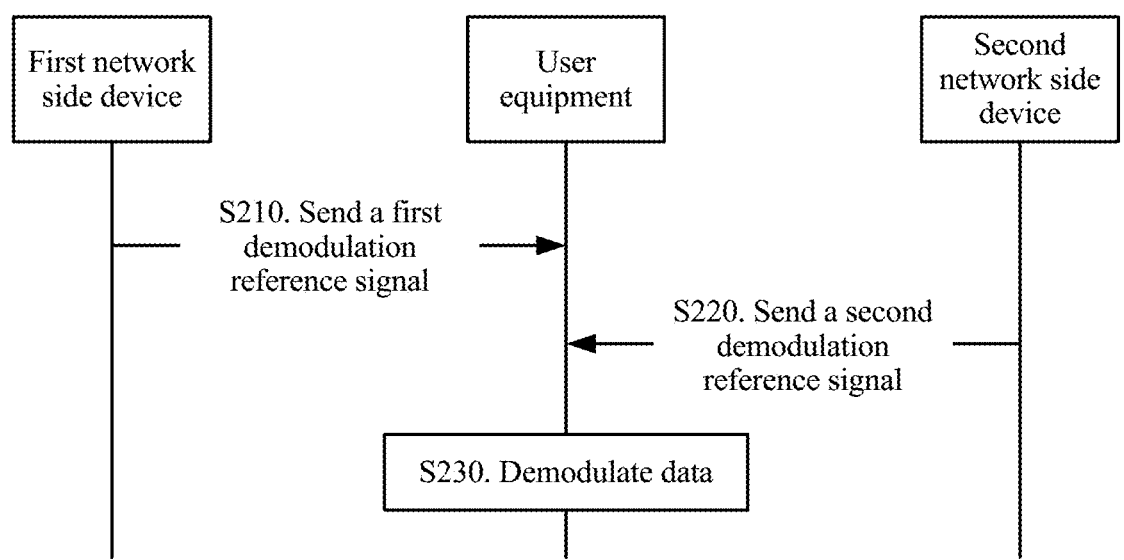
FIG. 2 is a schematic flowchart of a coordinated multipoint transmission/reception method according to this application.

FIG. 2 shows a coordinated multipoint transmission/reception method 200 according to this application. The method 200 may be applied to the wireless communications system 100 shown in FIG. 1. However, this application is not limited thereto.

S210. A first network side device sends first demodulation reference signal(s) to user equipment by using n antenna port(s).

Optionally, the first network side device may further send first data by using the n antenna port(s). Specifically, the first network side device obtains a code word by encoding first original data by using a modulation and coding scheme, and then performs layer mapping and precoding processing on the code word to obtain the first data. The first network side device sends the first data to the user equipment by using the n antenna port(s), so that the user equipment can perform demodulation processing on the first data based on the first demodulation reference signal(s) to obtain the first original data.

Optionally, the n antenna port(s) may occupy same time-frequency resources to send the first demodulation reference signal(s).

S220. A second network side device sends second demodulation reference signal(s) to the user equipment by using m antenna port(s).

Optionally, the second network side device may further send second data by using the m antenna port(s). Specifically, the second network side device obtains a code word by encoding second original data by using a modulation and coding scheme, and then performs layer mapping and precoding processing on the code word to obtain the second data. The second network side device sends the second data to the user equipment by using the m antenna port(s), so that the user equipment can perform demodulation processing on the second data based on the second demodulation reference signal(s) to obtain the second original data.

Optionally, the m antenna port(s) may occupy same time-frequency resources to send the second demodulation reference signal(s).

S230. The user equipment performs demodulation processing on data based on the received first demodulation reference signal(s) and the received second demodulation reference signal(s).

Specifically, the user equipment may perform demodulation processing on the first data based on the first demodulation reference signal(s) sent by the first network side device, so as to obtain the first original data; and may also perform demodulation processing on the second data based on the second demodulation reference signal(s) sent by the second network side device, so as to obtain the second original data. Optionally, alternatively, the user equipment may perform joint demodulation on the first data and the second data based on the first demodulation reference signal(s) and the second demodulation reference signal(s), so as to obtain the first original data and the second original data.

It should be understood that, for the first demodulation reference signal(s) sent by the first network side device and the second demodulation reference signal(s) sent by the second network side device, the demodulation reference signal herein is a DM-RS, and is a known signal used to demodulate a data channel and/or a control channel. The demodulation reference signal has a specific association relationship with a corresponding data channel and/or control channel. For example, in LTE, a demodulation reference signal associated with a PDSCH uses a same transmit port, is corresponding to a same quantity of transmission layers, and occupies a same physical resource block (Physical Resource Block, PRB) as the PDSCH. In addition, a channel corresponding to the PDSCH associated with the demodulation reference signal may be estimated by using the demodulation reference signal, so as to demodulate the PDSCH.

In the LTE Release R10 in the prior art, when a single network side device sends demodulation reference signal(s) and data to user equipment, the demodulation reference signal(s) may be transmitted by using eight antenna ports. In other words, simultaneous transmission of a maximum of eight data streams is supported. When sending the data to the user equipment, the network side device uses a maximum of two code words, that is, uses two independent modulation and coding schemes to encode the data. Each code word has an independent modulation and coding scheme and an independent hybrid retransmission entity. Therefore, each code word may be mapped to a maximum of four layers, that is, be corresponding to a maximum of four data streams. Specifically, a mapping relationship used when the network side device sends the demodulation reference signal and the data to the user equipment may be shown in FIG. 3 and FIG. 4.

Figure 3:
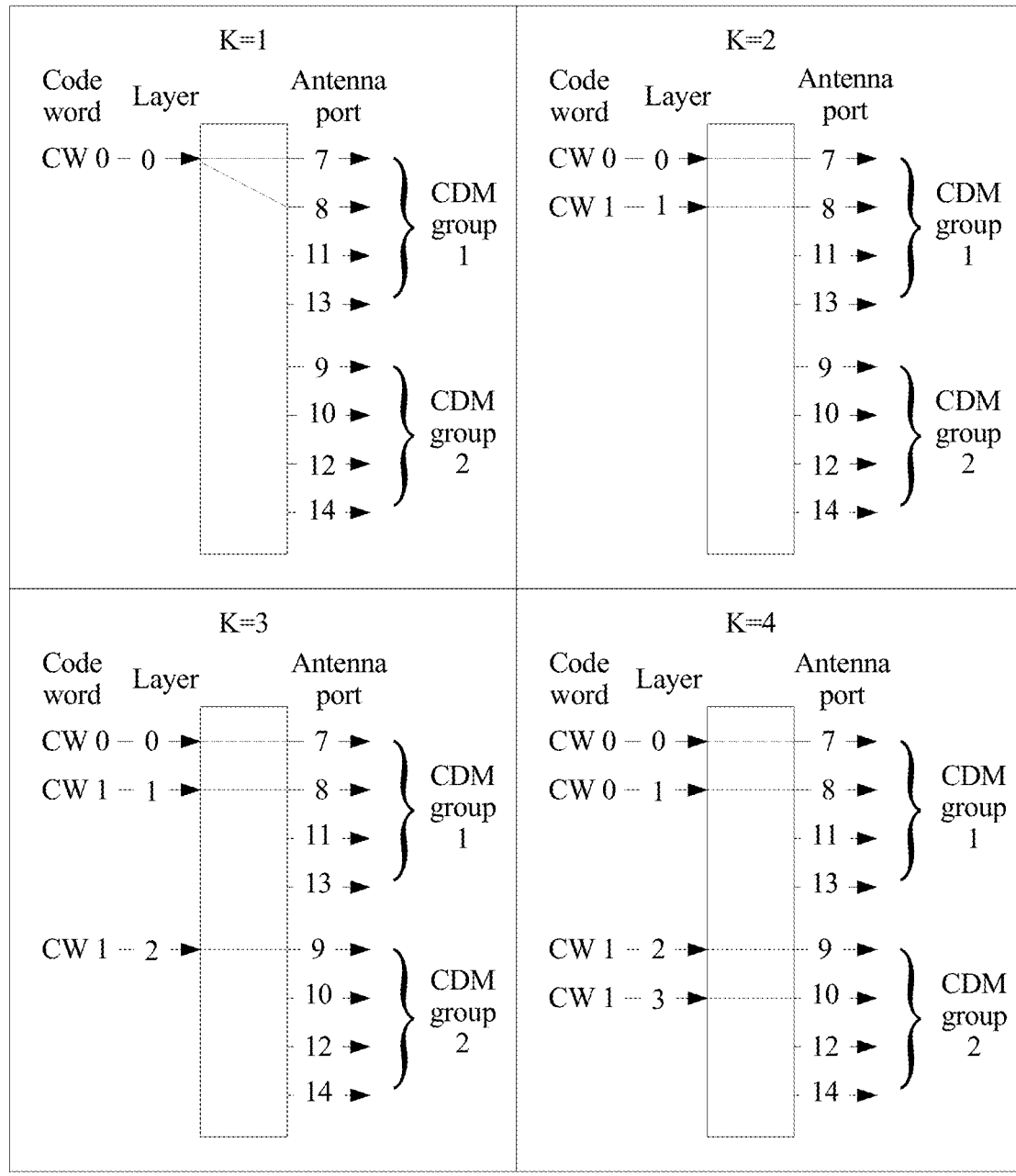
FIG. 3 is a schematic diagram of a mapping relationship among a code word, a layer, and an antenna port in an LTE system according to this application.
Figure 4:
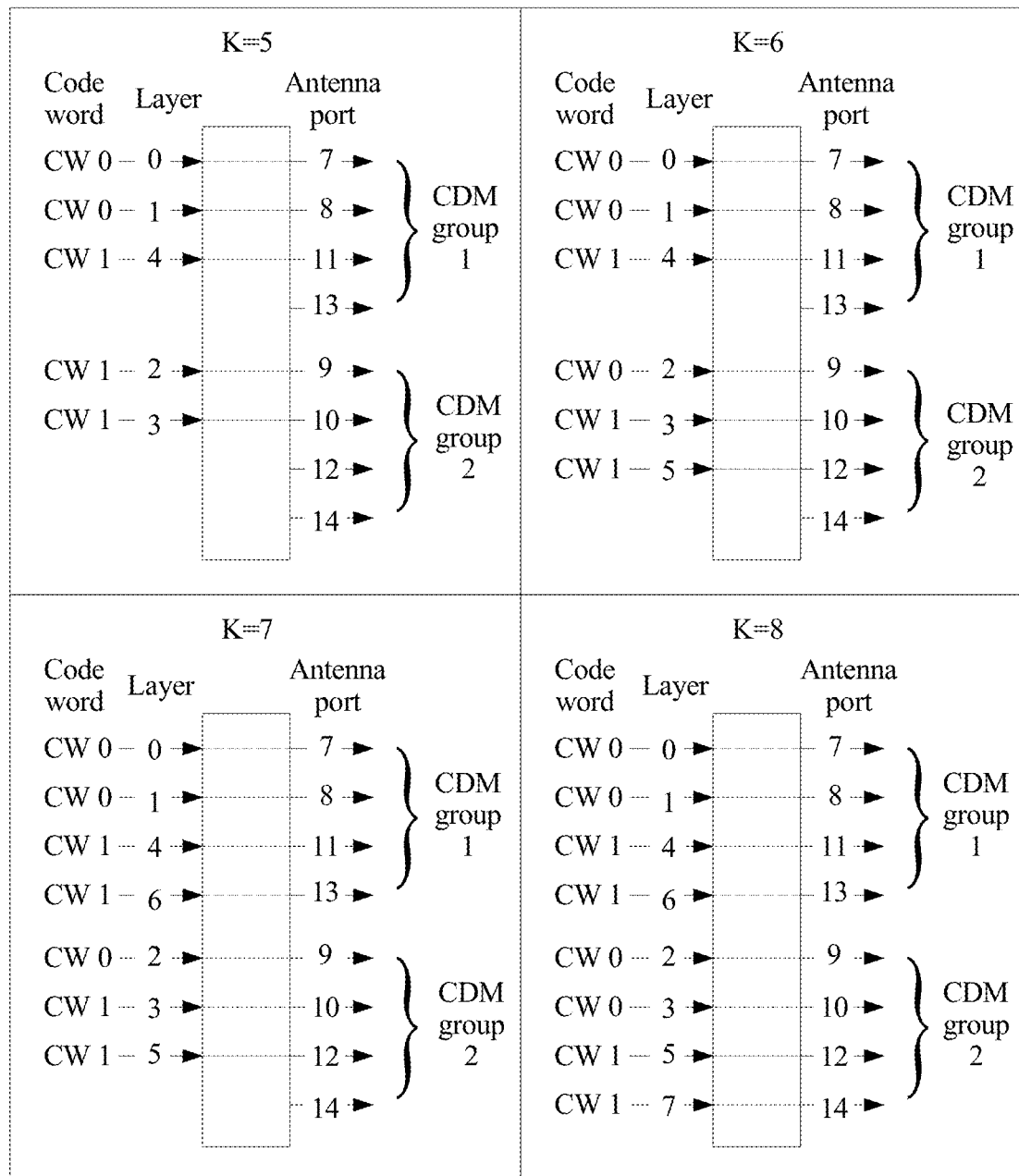
FIG. 4 is another schematic diagram of a mapping relationship among a code word, a layer, and an antenna port in an LTE system according to this application.
Figure 5:
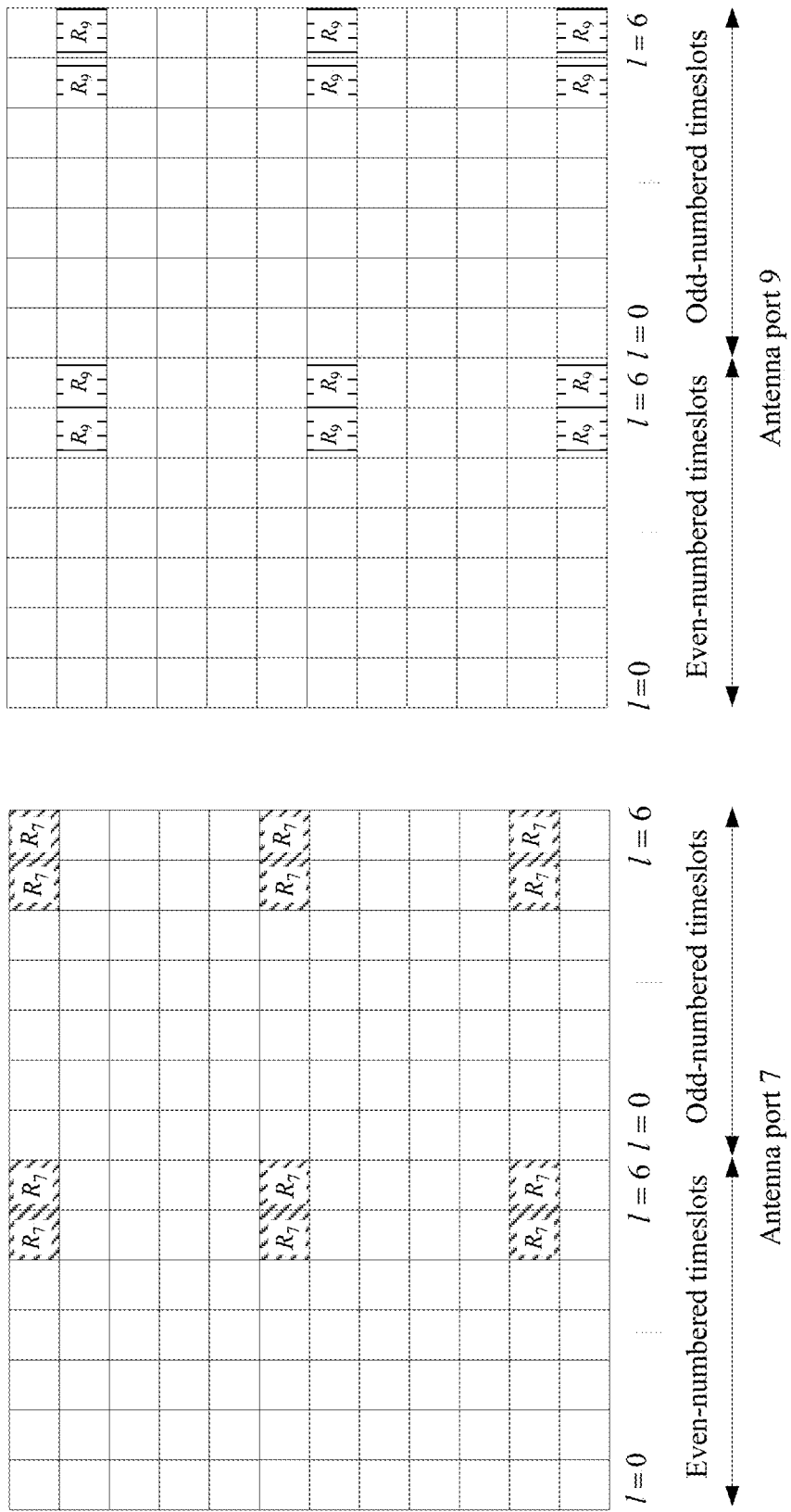
FIG. 5 is a schematic diagram of time-frequency resources occupied by demodulation reference signal(s) sent by antenna ports 7 and 9 in an LTE system according to this application.

As shown in FIG. 3 and FIG. 4, k in the figure indicates a quantity of PDSCH layers. Antenna ports 7, 8, 11, and 13 are corresponding to a CDM group 1, that is, the four antenna ports may send demodulation reference signal(s) by using same time-frequency resources. Antenna ports 9, 10, 12, and 14 are corresponding to a CDM group 2, that is, the four antenna ports may send demodulation reference signal(s) by using same time-frequency resources. However, an antenna port in the CDM group 1 and that in the CDM group 2 occupy different time-frequency resources to send demodulation reference signal(s). Specifically, as shown in FIG. 5, the antenna port 7 in the CDM group 1 is used as an example, and the antenna port 9 in the CDM group 2 is used as an example. A demodulation reference signal sent by the antenna port 7 is denoted as R7, and a demodulation reference signal sent by the antenna port 9 is denoted as R9. It can be learned from FIG. 5 that the antenna ports 7 and 9 occupy same time domain resources but different frequency domain resources to send the demodulation reference signal(s). Correspondingly, each antenna port in the CDM group 1 and each antenna port in the CDM group 2 may occupy same time domain resources but different frequency domain resources to send demodulation reference signal(s). The network side device encodes data to obtain a code word, maps the code word to a layer, then maps the layer to an antenna port, sends encoded data to the user equipment by using the corresponding antenna port, and sends the demodulation reference signal by using the corresponding antenna port, so that the user equipment performs demodulation processing on the received data based on the demodulation reference signal to obtain original data. For example, as shown in FIG. 3, when k=1, the network side device encodes data to obtain a code word (Code word, CW) 0, maps the CW 0 to a layer 0, then maps the layer 0 to the antenna port 7 or 8, and sends encoded data and a demodulation reference signal to the user equipment by using the antenna port 7 or 8. The user equipment performs demodulation processing on the received data based on the received demodulation reference signal sent by using the antenna port 7 or 8, to obtain original data.

For another example, as shown in FIG. 3 and FIG. 4, when k is greater than 1, the network side device transmits data by using two code words: a CW 0 and a CW 1, maps the CW 0 and the CW 1 to a layer 0 to a layer k−1, and correspondingly uses the antenna port 7 to an antenna port k+6. The CW 0 is mapped to a lower-digit antenna port number, and the CW 1 is mapped to a higher-digit antenna port number. In addition, when k is an even number, a quantity of layers to which the CW 0 is mapped is equal to a quantity of layers to which the CW 1 is mapped. When k is an odd number, a quantity of layers to which the CW 0 is mapped is one less than a quantity of layers to which the CW 1 is mapped.

In this application, the user equipment may simultaneously communicate with the second network side device by using the first network side device. The first network side device and the second network side device are located at different locations, and the first network side device and the second network side device do not meet a quasi-co-location requirement, and cannot separately use the foregoing manner in which the single network side device sends the demodulation reference signal and the data. Therefore, this application provides the coordinated multipoint transmission/reception method 200.

It should be noted that, in CoMP transmission, it is assumed that radio channels through which signals received by the user equipment from a plurality of antenna ports pass have a same large-scale feature. In other words, the plurality of antenna ports belong to a same QCL set. In this way, for two network side devices in which a radio channel between one network side device and user equipment is different from a radio channel between the other network side device and the user equipment, if the two network side devices need to simultaneously send data to the user equipment, joint virtualization needs to be performed on antennas in the two network side devices to form an antenna port that meets QCL constraint, and a demodulation reference signal and data are sent on the antenna port. One joint virtualization method is a single frequency network (Single Frequency Network, SFN) technology. To be specific, a first antenna port in an antenna set of the first network side device and a second antenna port in an antenna set of the second network side device are combined into one antenna port. Data sent from the antenna port is same modulation symbols sent by a first antenna port and a second antenna port on same time-frequency resources.

Figure 6:
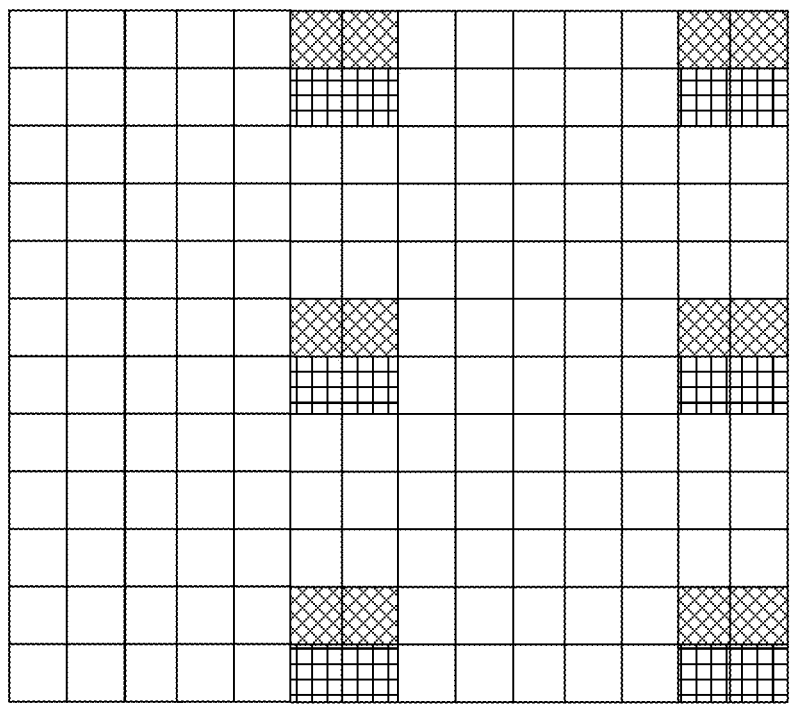
FIG. 6 is a schematic diagram of a time-frequency resource occupied by a demodulation reference signal in coordinated multipoint transmission/reception according to this application.

In S210 of the method 200, the first network side device sends the first demodulation reference signal(s) in a subframe by using the n antenna port(s). The n antenna port(s) may occupy same or different time-frequency resources to send the first demodulation reference signal(s). For example, the same time-frequency resources are occupied. For example, in the subframe, the time-frequency resources occupied by the n antenna port(s) to send the first demodulation reference signal(s) may be resource elements (Resource Element, RE) that are in a subframe shown in FIG. 6 and in which oblique grid shadow is located. In other words, the n antenna port(s) are corresponding to n of antenna ports 7, 8, 11, and 13 according to a division manner in an existing LTE system, and all the time-frequency resources occupied to send the first demodulation reference signal(s) are the same, and are time-frequency resources occupied by the antenna port 7 shown in FIG. 5. Alternatively, the time-frequency resources occupied by the n antenna port(s) to send the first demodulation reference signal(s) may be REs that are in the subframe shown in FIG. 6 and in which square grid shadow is located. In other words, the n antenna port(s) are corresponding to n of antenna ports 9, 10, 12, and 14, and the time-frequency resources occupied to send the first demodulation reference signal(s) are also the same, and are time-frequency resources occupied by the antenna port 9 shown in FIG. 5.

In S220, correspondingly, in the same subframe, the second network side device sends the second demodulation reference signal(s) by using the m antenna port(s). The m antenna port(s) may also occupy same or different time-frequency resources to send the second demodulation reference signal(s), and the time-frequency resources occupied by the m antenna port(s) to send the second demodulation reference signal(s) are different from the time-frequency resources occupied by the n antenna port(s) of the first network side device to send the first demodulation reference signal(s). For example, according to the division manner in the LTE system in the prior art, time-frequency resources occupied by antenna ports to send demodulation reference signal(s) are divided in a fixed manner. Therefore, the first network side device may send the first demodulation reference signal(s) by using n antenna port(s) in the antenna ports 7, 8, 11, and 13, that is, by occupying the REs that are in the subframe shown in FIG. 6 and in which the oblique grid shadow is located; and the second network side device may send the second demodulation reference signal(s) by using m antenna port(s) in the antenna ports 9, 10, 12, and 14, that is, by occupying the REs that are in the subframe shown in FIG. 6 and in which the square grid shadow is located. Alternatively, the first network side device sends the first demodulation reference signal(s) by using n antenna port(s) in the antenna ports 9, 10, 12, and 14, that is, by occupying the REs that are in the subframe shown in FIG. 6 and in which the square grid shadow is located; and the second network side device sends the second demodulation reference signal(s) by using m antenna port(s) in the antenna ports 7, 8, 11, and 13, that is, by occupying the REs that are in the subframe shown in FIG. 6 and in which the oblique grid shadow is located.

It should be understood that, that the user equipment receives the demodulation reference signal(s) sent by the first network side device and those sent by the second network side device means that the user equipment may receive demodulation reference signal(s) sent by at least two network side devices. The first network side device and the second network side device may be any two of the at least two network side devices, or may be any plurality of network side devices.

It should be understood that, that the time-frequency resources occupied by the first network side device to send the first demodulation reference signal(s) are different from the time-frequency resources occupied by the second network side device to send the second demodulation reference signal(s) includes: Time domain resources are the same but frequency domain resources are different; frequency domain resources are the same but time domain resources are different; and time domain resources are different and frequency domain resources are different. That time domain resources are different means that demodulation reference signals are sent by using different time domain symbols in the subframe. Herein, an example in which the first demodulation reference signal(s) and the second demodulation reference signal(s) occupy same time domain resources but different frequency domain resources is merely used for description. However, this application is not limited thereto.

Optionally, in an embodiment, the first network side device sends the first demodulation reference signal(s) in the subframe by using the n antenna port(s). All of the n antenna port(s) may occupy different time-frequency resources to send the first demodulation reference signal(s). Likewise, the second network side device sends the second demodulation reference signal(s) in the subframe by using the m antenna port(s). All of the m antenna port(s) may also occupy different time-frequency resources to send the second demodulation reference signal(s). However, the time-frequency resources occupied by all of the n antenna port(s) of the first network side device to send the first demodulation reference signal(s) are totally different from the time-frequency resources occupied by all of the m antenna port(s) of the second network side device to send the second demodulation reference signal(s).

For example, the first network side device and the second network side device include eight antenna ports in total. According to a grouping method in existing LTE, the eight antenna ports may be divided into two groups: a CDM group 1 and a CDM group 2. Antenna ports in each group occupy same time-frequency resources to send demodulation reference signal(s). In this case, the first network side device may send demodulation reference signal(s) by using antenna ports in one group, and the second network side device may send demodulation reference signal(s) by using antenna ports in the other group. However, if division is not performed according to the method, it is assumed that demodulation reference signal(s) sent by the eight antenna ports may be divided into four groups. Each group occupies different time-frequency resources. The four groups of antenna ports may be equally allocated to the first network side device and the second network side device. To be specific, the first network side device may occupy two groups of antenna ports to send demodulation reference signal(s), and the second network side device may occupy the two other groups of antenna ports to send demodulation reference signal(s). Alternatively, the four groups of antenna ports are not equally allocated to the first network side device and the second network side device. One network side device occupies one group, and the other network side device occupies three groups. In this way, demodulation reference signal(s) sent by a plurality of antenna ports of the first network side device may occupy different time-frequency resources, demodulation reference signal(s) sent by a plurality of antenna ports of the second network side device may also occupy different time-frequency resources, and a condition that different time-frequency resources are occupied when the first network side device and the second network side device send the demodulation reference signal(s) is met. This application is not limited thereto.

In this application, a first antenna port set is determined in a plurality of antenna ports of the first network side device. The first demodulation reference signal(s) may be sent by using an antenna in the first antenna port set. Likewise, a second antenna port set is determined in a plurality of antenna ports of the second network side device. The second demodulation reference signal(s) may be sent by using an antenna in the second antenna port set. In addition, the first antenna port set and the second antenna port set meet the following condition: A time-frequency resource occupied by each antenna port in the first antenna port set to send a demodulation reference signal is totally different from a time-frequency resource occupied by each antenna port in the second antenna port set to send a demodulation reference signal. In addition, that occupied time-frequency resources are different means that antenna port numbers are different. To be specific, a port number of each antenna port in the first antenna port set is different from a port number of each antenna port in the second antenna port set.

Therefore, the first network side device may determine the first n antenna port(s) in the first antenna port set. The first n antenna port(s) are the n antenna port(s) for sending the first demodulation reference signal(s). Likewise, the second network side device may determine the first m antenna port(s) in the second antenna port set. The first m antenna port(s) are the m antenna port(s) for sending the second demodulation reference signal(s). In addition, antenna ports in the first antenna port set are arranged based on a same preset rule as those in the second antenna port set. For example, the antenna ports in each of the two sets are arranged based on port numbers in ascending order. The first network side device selects the first n antenna port(s) from the first antenna port set, and the second network side device selects the first m antenna port(s) from the second antenna port set, where n is less than or equal to a quantity of antenna ports in the first antenna port set, and m is less than or equal to a quantity of antenna ports in the second antenna port set. For example, in the existing LTE system, the first antenna port set may be 7, 8, 11, and 13, which are grouped based on a CDM group. If the antenna ports are arranged based on port numbers in ascending order, the first n antenna port(s) in the antenna ports 7, 8, 11, and 13 are selected. The second antenna port set of the second network side device is 9, 10, 12, and 14, and the first m antenna port(s) in the antenna ports 9, 10, 12, and 14 are selected. Both n and m are less than or equal to 4.

It should be understood that, a status of occupying the antenna port by the first network side device and the second network side device may be notified by a service network side device to the user equipment by using higher layer signaling.

Optionally, before the first network side device and the second network side device send the first demodulation reference signal(s) and the second demodulation reference signal(s) to the user equipment, the first network side device or the second network side device may send a configuration message to the user equipment.

Optionally, the configuration message may include antenna port group information used to send a demodulation reference signal and a corresponding data signal, that is, the first antenna port set and the second antenna port set in this application. The antenna port group information may include CDM group number information. Optionally, CDM groups are numbered, and the configuration message may indicate a CDM group number included in each piece of antenna port group information. For example, when demodulation reference signal(s) corresponding to eight antenna ports occupy four groups of different time-frequency resources, a CDM group {1, 2, 3} is a piece of antenna port group information, and a CDM group {4} is another piece of antenna port group information; or a CDM group {1, 2} is a piece of antenna port group information, a CDM group {3} is a second piece of antenna port group information, and a CDM group {4} is a third piece of antenna port group information. Optionally, the configuration message may be sent by using a higher layer message such as an RRC message or a Media Access Control control element (MAC CE) message, or may be sent by using a physical layer control message. A MAC CE is control signaling, may be carried in a MAC layer message, and may be used to implement effective data transmission.

In this application, the first network side device may further send the first data in the subframe by using the n antenna port(s). Specifically, when sending the first original data to the user equipment, the first network side device may first perform encoding processing on the first original data by using the modulation and coding scheme, to obtain the code word; then perform layer mapping and precoding processing on the code word to obtain the first data; and send the first data to the user equipment by using the n antenna port(s). Optionally, when encoding the first original data, the first network side device may use a first modulation and coding scheme to obtain a first code word, that is, the first network side device uses one modulation and coding scheme to perform encoding; or may use two modulation and coding schemes to obtain two code words.

Correspondingly, the second network side device may send the second data in the subframe by using the m antenna port(s). Specifically, when sending the second original data to the user equipment, the second network side device may first perform encoding processing on the second original data by using the modulation and coding scheme, to obtain the code word; then perform layer mapping and precoding processing on the code word to obtain the second data; and send the second data to the user equipment by using the m antenna port(s). Optionally, when encoding the second original data, the second network side device may use a second modulation and coding scheme to obtain a second code word, that is, the second network side device uses one modulation and coding scheme to perform encoding; or may use two modulation and coding schemes to obtain two code words.

It should be understood that the first code word of the first network side device may be the same as or different from the second code word of the second network side device. When the first code word is the same as the second code word, for example, in a multipoint diversity transmission scenario, content of the first data sent by the first network side device is the same as that of the second data sent by the second network side device, and encoding may be performed by using a same modulation and coding scheme, to obtain the first data and the second data that are the same. When the first code word is different from the second code word, for example, in a multipoint multi-stream transmission scenario, content of the first data sent by the first network side device is different from that of the second data sent by the second network side device, and the first modulation and coding scheme used by the first network side device may be different from the second modulation and coding scheme used by the second network side device, to obtain the first data and the second data that are different.

In this application, the service network side device may send indication information to the user equipment to indicate a quantity n of antenna ports occupied by the first network side device and/or a quantity m of antenna ports occupied by the second network side device. The service network side device may carry the indication information in a sent physical downlink control channel (such as a PDCCH), for example, may add a new indication field to the physical downlink control channel, for example, may use one bit or two or more bits as the indication field.

Optionally, a sum of a quantity n of transmission layers for the first code word and a quantity m of transmission layers for the second code word is a value of a rank RI. When learning of a value of n or m, the user equipment may learn of the other value based on the value of the RI. Therefore, the indication information may include only the quantity n of transmission layers for the first code word of the first network side device, or include only the quantity m of transmission layers for the second code word of the second network side device. Then the other quantity of transmission layers that is not indicated in the indication information is determined based on a total quantity of transmission layers.

In this application, the service network side device may send indication information to the user equipment to indicate an antenna port group that is used by the first network side device and that is configured by using a network side configuration message, and/or an antenna port group that is used by the second network side device and that is configured by using a network side configuration message. Optionally, the indication information may explicitly or implicitly give an indication. For example, the service network side device may send the indication information to the user equipment. The indication information explicitly indicates antenna port group information used by the first network side device and/or antenna port group information used by the second network side device. The indication information may be a physical layer control message or a higher layer message, such as an RRC message or a MAC CE message. For another example, the antenna port group used by the first network side device and/or that used by the second network side device may be implicitly indicated by using the indication information, for example, may be implicitly indicated in an antenna port grouping order indicated in an antenna port configuration message sent by the service network side device. For example, a first antenna port group is used by default when only one network side device sends data. Antenna port groups configured on a network side are used by default in the antenna port grouping order when a plurality of network side devices simultaneously send data.

In this application, the service network side device may send indication information to the user equipment to indicate QCL information corresponding to an antenna port group used by the first network side device and/or QCL information corresponding to an antenna port group used by the second network side device. The QCL information indicates that a currently used antenna port group and an antenna port used for a configured resource meet a QCL relationship. Optionally, the network side device may preconfigure a plurality of groups of resource information for the user equipment. The resource information may include one or more pieces of resource information such as resource information corresponding to a channel state information reference signal CSI-RS, an identifier (ID) used to identify the resource information, resource information corresponding to a cell-level reference signal, an ID corresponding to the resource information, synchronization channel resource information used for synchronization, resource information used to identify a spatial resource such as a beam, and resource information corresponding to a mobility reference signal MRS used for mobility management. Optionally, each of the plurality of groups of resource information may be corresponding to one group number. A QCL relationship between the currently used antenna port group and resource information corresponding to the group may be indicated, to assist the user equipment in jointly performing channel estimation and signal demodulation by jointly using a DMRS sent by a currently used antenna port and the resource information corresponding to the group, so as to improve demodulation performance. Optionally, the QCL information corresponding to the antenna port group used by the network side device may be sent by using a physical layer control message or a higher layer message, such as a MAC CE message or an RRC message.

In S230, the user equipment may perform demodulation processing on the received first data based on the first demodulation reference signal(s) to obtain the first original data, and perform demodulation processing on the received second data based on the second demodulation reference signal(s) to obtain the second original data. In consideration of complexity of performing data demodulation by the user equipment, two code words may be used for transmission. To be specific, the first network side device encodes the first original data by using a modulation and coding scheme, for example, encodes the first original data by using the first modulation and coding scheme, to obtain the first code word such as a code word 0. The second network side device also encodes the second original data by using a modulation and coding scheme, for example, encodes the second original data by using the second modulation and coding scheme, to obtain the second code word such as a code word 1. In this case, the user equipment may receive the first code word and the second code word, and separately demodulate or jointly demodulate the first data and the second data based on the first code word and the second code word.

In this application, description is provided by using an example in which the first network side device encodes the first original data by using a modulation and coding scheme, that is, the first modulation and coding scheme, to obtain the first code word, and the second network side device also encodes the second original data by using a modulation and coding scheme, that is, the second modulation and coding scheme, to obtain the second code word. The first modulation and coding scheme is different from the second modulation and coding scheme. The first network side device and the second network side device each perform encoding by using one modulation and coding scheme. Therefore, a quantity of transmission layers to which the first code word determined by the first network side device is mapped is equal to the quantity n of antenna ports, and a quantity of transmission layers to which the second code word determined by the second network side device is mapped is equal to the quantity m of antenna ports. In addition, the quantity n of transmission layers corresponding to the first code word and the quantity m of transmission layers corresponding to the second code word may be indicated by using indication information sent by the service network side device.

In this application, a CDM group division manner in the existing LTE system may be used to determine the n antenna port(s) used by the first network side device to send the first demodulation reference signal(s) and the m antenna port(s) used by the second network side device to send the second demodulation reference signal(s). Specifically, the n antenna port(s) of the first network side device may be the first n antenna port(s) in antenna ports 7, 8, 11, and 13 in a CDM group 1, and the m antenna port(s) of the second network side device may be the first m antenna port(s) in antenna ports 9, 10, 12, and 14 in a CDM group 2. In this case, the first code word is mapped to a layer 0 to a layer n−1, and the layer 0 to the layer n−1 are mapped to the first n antenna port(s) in the antenna ports 7, 8, 11, and 13 in order. The second code word is mapped to a layer n to a layer n+m−1, and the layer n to the layer n+m−1 are mapped to the first m antenna port(s) in the antenna ports 9, 10, 12, and 14 in order. Alternatively, the n antenna port(s) of the first network side device may be the first n antenna port(s) in antenna ports 9, 10, 12, and 14 in a CDM group 2, and the m antenna port(s) of the second network side device may be the first m antenna port(s) in antenna ports 7, 8, 11, and 13 in a CDM group 1. In this case, the first code word is mapped to a layer 0 to a layer n−1, and the layer 0 to the layer n−1 are mapped to the first n antenna port(s) in the antenna ports 9, 10, 12, and 14 in order. The second code word is mapped to a layer n to a layer n+m−1, and the layer n to the layer n+m−1 are mapped to the first m antenna port(s) in the antenna ports 7, 8, 11, and 13 in order.

Optionally, description is provided by using an example in which the n antenna port(s) of the first network side device are the first n antenna port(s) in the antenna ports 7, 8, 11, and 13 in the CDM group 1, and the m antenna port(s) of the second network side device are the first m antenna port(s) in the antenna ports 9, 10, 12, and 14 in the CDM group 2.

Figure 7:
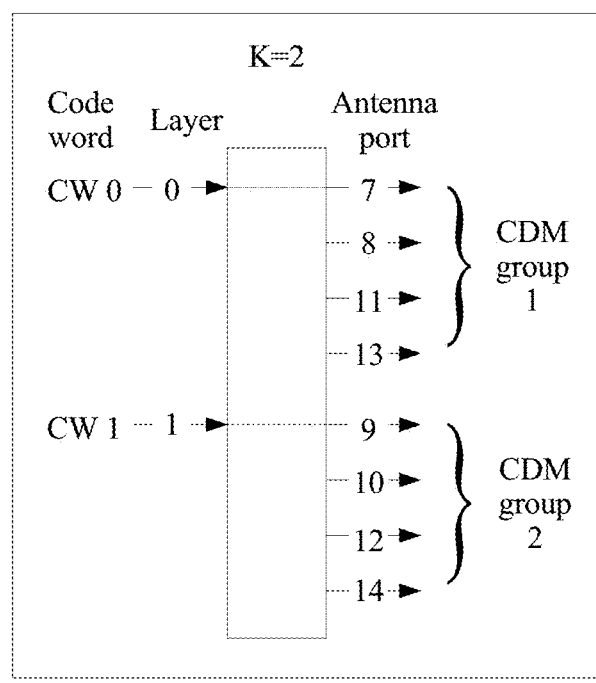
FIG. 7 is a schematic diagram of a mapping relationship among a code word, a layer, and an antenna port in a coordinated multipoint transmission/reception scenario according to this application.

Optionally, in an embodiment, as shown in FIG. 7, when a total quantity k of PDSCH layers is 2, the first code word of the first network side device is mapped to a layer 0, the second code word of the second network side device is mapped to a layer 1, the layer 0 is mapped to the antenna port 7, and the layer 1 is mapped to the antenna port 9.

Figure 8:
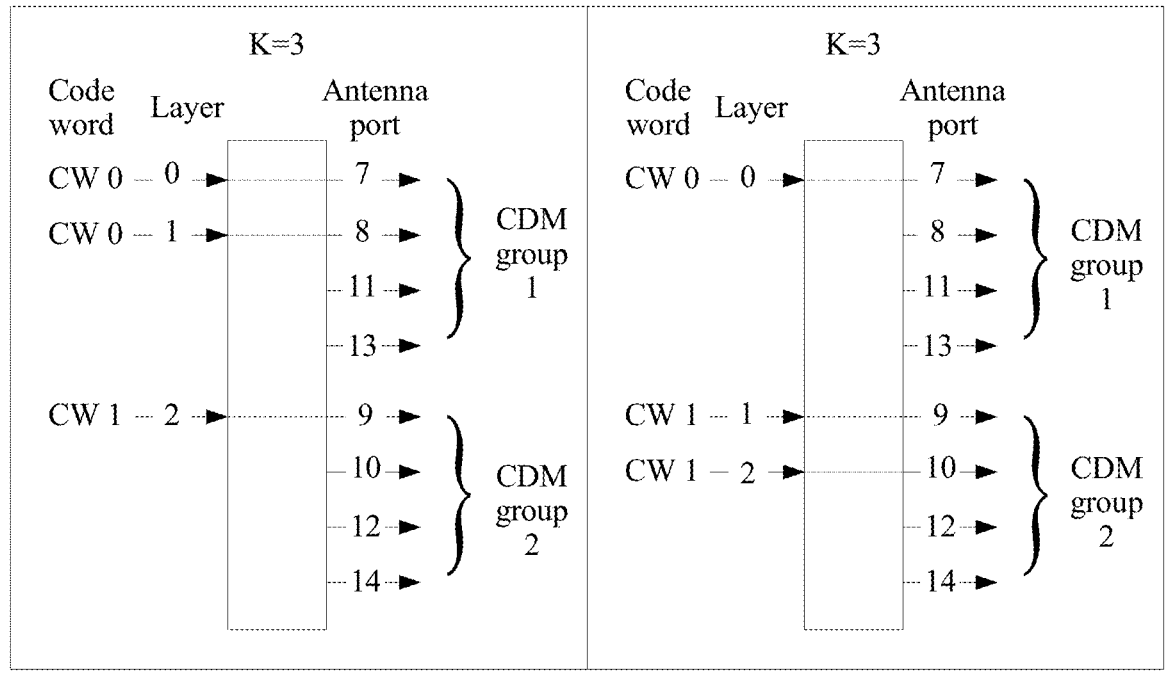
FIG. 8 is another schematic diagram of a mapping relationship among a code word, a layer, and an antenna port in a coordinated multipoint transmission/reception scenario according to this application.

Optionally, in an embodiment, as shown in FIG. 8, when a total quantity k of PDSCH layers is 3, the first network side device may occupy two layers, and the second network side device may occupy one layer; or the first network side device may occupy one layer, and the second network side device may occupy two layers. Specifically, when the first network side device occupies two layers, and the second network side device occupies one layer, the first code word is mapped to a layer 0 and a layer 1, and the layer 0 and the layer 1 are respectively mapped to the antenna ports 7 and 8 in order; and the second code word is mapped to a layer 2, and the layer 2 is mapped to the antenna port 9. When the first network side device occupies one layer, and the second network side device occupies two layers, the first code word is mapped to a layer 0, and the layer 0 is mapped to the antenna port 7; and the second code word is mapped to a layer 1 and a layer 2, and the layer 1 and the layer 2 are respectively mapped to the antenna ports 9 and 10 in order.

Figure 9:
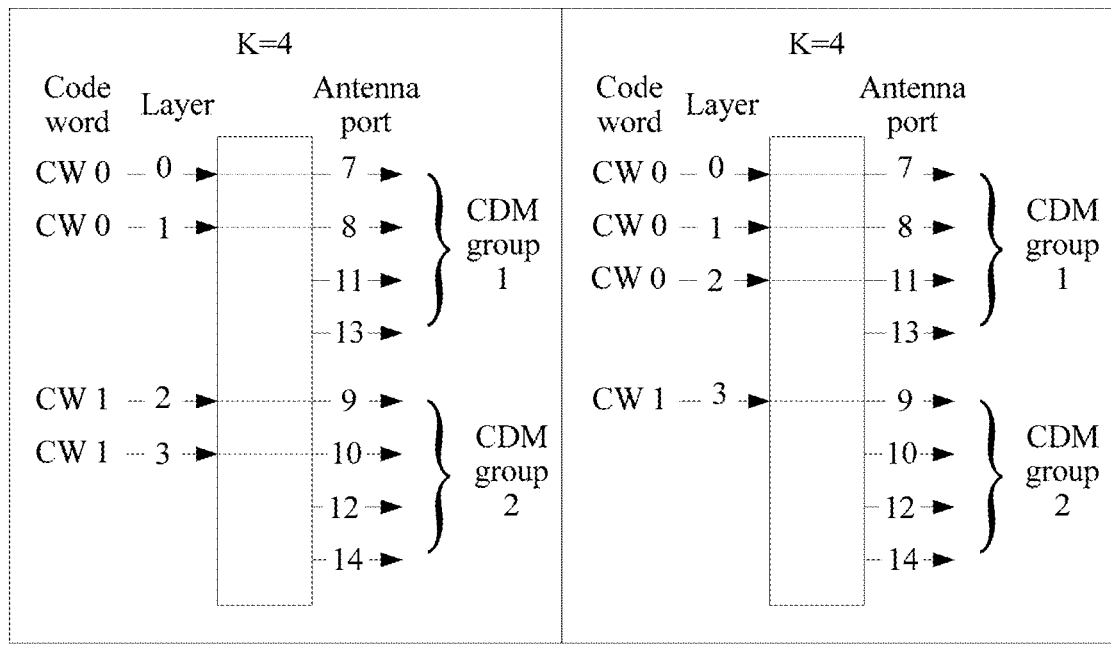
FIG. 9 is still another schematic diagram of a mapping relationship among a code word, a layer, and an antenna port in a coordinated multipoint transmission/reception scenario according to this application.

Optionally, in an embodiment, as shown in FIG. 9, when a total quantity k of PDSCH layers is 4, the first network side device and the second network side device may occupy two layers each. To be specific, the first code word is mapped to a layer 0 and a layer 1, and the layer 0 and the layer 1 are respectively mapped to the antenna ports 7 and 8 in order; and the second code word is mapped to a layer 2 and a layer 3, and the layer 2 and the layer 3 are respectively mapped to the antenna ports 9 and 10 in order. Alternatively, the first network side device occupies one layer, and the second network side device occupies three layers. Alternatively, the first network side device occupies three layers, and the second network side device occupies one layer. For example, the first network side device occupies three layers, and the second network side device occupies one layer. To be specific, the first code word is separately mapped to a layer 0, a layer 1, and a layer 2, and the layer 0, the layer 1, and the layer 2 are respectively mapped to the antenna ports 7, 8, and 11 in order; and the second code word is mapped to a layer 3, and the layer 3 is mapped to the antenna port 9.

Therefore, demodulation reference signal(s) sent by different network side devices are transmitted in the foregoing manner. The foregoing manner may be applied to coordinated multipoint transmission/reception in which network side devices that are not quasi-co-located simultaneously send data to user equipment. For a problem that there are different frequency offsets when the signals sent by the different network side devices arrive at the user equipment, the user equipment may provide independent frequency offset compensation, and ensure orthogonality between demodulation reference signal(s) from a plurality of network side devices.

In this application, to reduce interference from a data symbol to a demodulation reference signal, silence processing may be performed on a time-frequency resource preceding or following a time-frequency resource occupied by a demodulation reference signal sent by an antenna port. In other words, data is not to be transmitted on the time-frequency resource. Specifically, because a location of the first network side device is different from that of the second network side device, a distance from the first network side device to the user equipment is different from a distance from the second network side device to the user equipment. Therefore, when the first network side device and the second network side device send signals to the user equipment at a same moment, moments at which the user equipment receives the signals are different. Optionally, the service network side device may determine that a signal sent by which one of the first network side device and the second network side device arrives at the user equipment earlier. For example, when the first network side device is the service network side device, the first network side device may determine that a signal sent by which one of the first network side device and the second network side device arrives at the user equipment earlier when the signals are simultaneously sent, for example, may perform determining by receiving feedback information sent by the user equipment.

Figure 10:
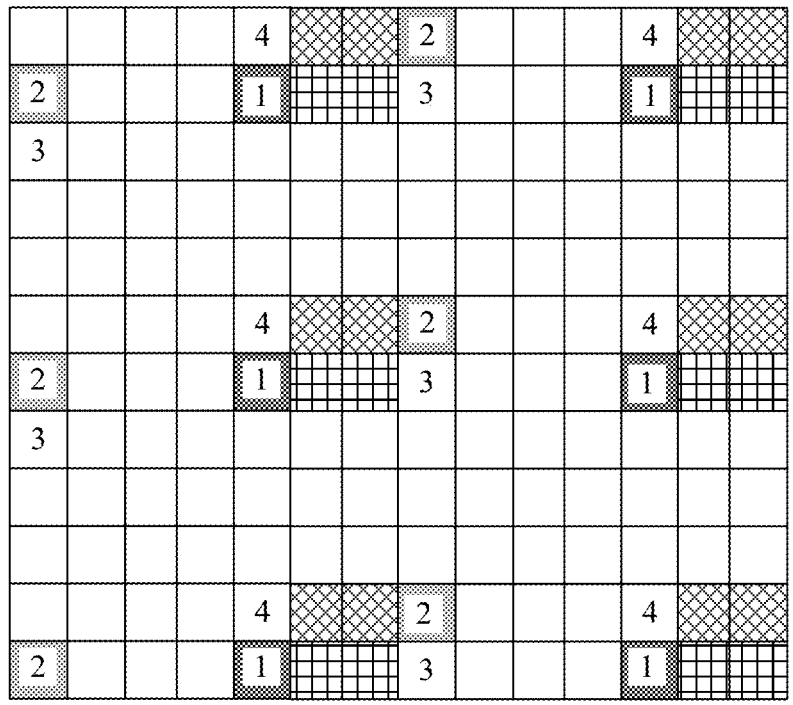
FIG. 10 is a schematic diagram of a time-frequency resource occupied by data in coordinated multipoint transmission/reception according to this application.

Optionally, in an embodiment, as shown in FIG. 10, it is assumed that the first network side device occupies time-frequency resources in oblique grid shadow to send the first demodulation reference signal(s). To be specific, the first network side device occupies the first n antenna port(s) in the antenna ports 7, 8, 11, and 13 to send the first demodulation reference signal(s). The second network side device occupies time-frequency resources in square grid shadow to send the second demodulation reference signal(s). To be specific, the second network side device occupies the first m antenna port(s) in the antenna ports 9, 10, 12, and 14 to send the second demodulation reference signal(s). If the first network side device and the second network side device simultaneously send signals to the user equipment at a first moment, the user equipment receives, at a second moment, the signal sent by the first network side device; and receives, at a third moment, the signal sent by the second network side device. When the second moment is later than the third moment, and a time difference between the second moment and the third moment is greater than or equal to a preset time period, silence processing may be performed to reduce the interference from the data symbol to the demodulation reference signal. In other words, data is not to be transmitted at a specific time-frequency resource location.

Specifically, a first RE is not occupied by the first network side device when sending the first data. The first RE may be a plurality of REs. For example, the first RE refers to locations of shaded grids with a number 1 in a subframe shown in FIG. 10. To be specific, rate matching is performed on REs that are in a symbol preceding REs occupied by the second network side device to send the second demodulation reference signal(s) and that are at same frequency domain resource locations as the REs. In addition, the second data sent by the second network side device does not occupy a second RE. The second RE may be a plurality of REs. For example, the second RE refers to locations of shaded grids with a number 2 in the subframe shown in FIG. 10. To be specific, rate matching is performed on REs that are in a symbol following REs occupied by the first network side device to send the first demodulation reference signal(s) and that are at same frequency domain resource locations as the REs.

Optionally, silence processing may be performed when a time difference between a moment at which a signal sent by the first network side device arrives at the user equipment and a moment at which a signal simultaneously sent by the second network side device arrives at the user equipment is greater than a preset time period. The preset time may be set based on an actual situation, for example, may be set based on a cyclic prefix (Cyclic Prefix, CP) length of a data symbol or a demodulation reference signal. This application is not limited thereto.

The first network side device that serves as a service network side device may determine that the moment at which the signal sent by the first network side device arrives at the user equipment is later than the moment at which the signal sent by the second network side device arrives at the user equipment. In this case, the first network side device may determine that the first network side device does not occupy the first RE to send the first data, and that the second network side device does not occupy the second RE to send the second data. In addition, the first network side device may notify, by using indication information, the user equipment and the second network side device that serves as a coordinated network side device. For example, the first network side device may send first indication information to the user equipment. The first indication information indicates time-frequency resources occupied by the user equipment to receive the first data sent by the first network side device and the second data sent by the second network side device. The first network side device may further send second indication information to the second network side device. The second indication information indicates the time-frequency resources occupied by the second network side device to send the second data.

Optionally, the service network side device sends the first indication information to the user equipment. The first indication information may be sent by using physical layer control signaling, or may be sent by using higher layer signaling. When the first indication information is sent by using the physical layer control signaling, the first indication information may be resource configuration information in the prior art.

Optionally, in the method, the service network side device may further send indication information to the user equipment. The indication information is used to indicate the quantity n of transmission layers corresponding to the first code word of the first network side device and the quantity m of transmission layers corresponding to the second code word of the second network side device. The indication information may be the same as the first indication information, and different content is indicated respectively by using different indication fields; or may be different from the first indication information, and different content is indicated respectively by using two pieces of information. This application is not limited thereto.

Specifically, the first network side device sends the first indication information to the user equipment. The first indication information may include a first silence indication field. The first silence indication field is used to indicate a time-frequency resource that is not occupied by the first network side device when sending the first data and a time-frequency resource that is not occupied by the second network side device when sending the second data. Optionally, when the first indication information is resource configuration information in the prior art, the first silence indication field may be newly added to the resource configuration information. This application is not limited thereto.

For example, the first silence indication field may occupy two bits. When the first silence indication field is 00, it indicates that both the first network side device and the second network side device do not perform silence processing, that is, do not perform rate matching on any RE. When the first silence indication field is 01, it indicates that the first network side device and the second network side device perform rate matching on a specific RE. Specifically, the first network side device does not transmit data on the first RE, and an RE that is in a symbol following the first RE and that is in a same subcarrier as the first RE is used by the second network side device to send the second demodulation reference signal(s). In addition, the second network side device does not transmit data on the second RE, and an RE that is in a symbol preceding the second RE and that is in a same subcarrier as the second RE is used by the first network side device to send the first demodulation reference signal(s). When the first silence indication field is 10, it indicates that the first network side device and the second network side device perform rate matching on a specific RE. Specifically, the first network side device does not transmit data on the first RE, and an RE that is in a symbol preceding the first RE and that is in a same subcarrier as the first RE is used by the second network side device to send the second demodulation reference signal(s). In addition, the second network side device does not transmit data on the second RE, and an RE that is in a symbol following the second RE and that is in a same subcarrier as the second RE is used by the first network side device to send the first demodulation reference signal(s). Therefore, for a time at which the first network side device arrives at the user equipment later than a channel of the second network side device, the service network side device may send the first indication information to the user equipment. The first indication information may include the first silence indication field. The first silence indication field is 01.

Correspondingly, the first network side device sends the second indication information to the second network side device. The second indication information includes a second silence indication field. The second silence indication field is used to indicate a time-frequency resource that is not occupied by the second network side device when transmitting the second data. Specifically, corresponding to the first silence indication field in the first indication information sent by the first network side device to the user equipment, when the first silence indication field indicates that the first network side device does not transmit data on the first RE, where the RE that is in the symbol following the first RE and that is in the same subcarrier as the first RE is used by the second network side device to send the second demodulation reference signal(s); and indicates that the second network side device does not transmit data on the second RE, where the RE that is in the symbol preceding the second RE and that is in the same subcarrier as the second RE is used by the first network side device to send the first demodulation reference signal(s), the corresponding second silence indication field is used to indicate that the second network side device does not transmit data on the second RE, and the RE that is in the symbol preceding the second RE and that is in the same subcarrier as the second RE is used by the first network side device to send the first demodulation reference signal(s).

Similarly, when the first network side device and the second network side device simultaneously send signals to the user equipment, if the signal from the first network side device arrives at the user equipment earlier than that from the second network side device, it is also assumed that, the first network side device occupies time-frequency resources in oblique grid shadow shown in FIG. 10 to send the first demodulation reference signal(s), to be specific, the first network side device occupies the first n antenna port(s) in the antenna ports 7, 8, 11, and 13 to send the first demodulation reference signal(s); and the second network side device occupies time-frequency resources in square grid shadow to send the second demodulation reference signal(s), to be specific, the second network side device occupies the first m antenna port(s) in the antenna ports 9, 10, 12, and 14 to send the second demodulation reference signal(s). Silence processing may also be performed to reduce the interference from the data symbol to the demodulation reference signal. In other words, data is not to be transmitted at a specific time-frequency resource location.

Specifically, a third RE is not occupied by the first network side device when sending the first data. The third RE may be a plurality of REs. For example, the third RE refers to locations of grids with a number 3 in the subframe shown in FIG. 10. To be specific, rate matching is performed on REs that are in a symbol following REs occupied by the second network side device to send the second demodulation reference signal(s) and that are at same frequency domain resource locations as the REs. In addition, a fourth RE is not occupied by the second network side device when sending the second data. The fourth RE may be a plurality of REs. For example, the fourth RE refers to locations of grids with a number 4 in the subframe shown in FIG. 10. To be specific, rate matching is performed on REs that are in a symbol preceding REs occupied by the first network side device to send the first demodulation reference signal(s) and that are at same frequency domain resource locations as the REs.

Likewise, the first network side device that serves as a service network side device may determine that the moment at which the signal sent by the first network side device arrives at the user equipment is earlier than the moment at which the signal sent by the second network side device arrives at the user equipment. In this case, the first network side device may determine that the first network side device does not occupy the third RE to send the first data, and that the second network side device does not occupy the fourth RE to send the second data. In addition, the first network side device may notify, by using indication information, the user equipment and the second network side device that serves as a coordinated network side device. For example, the first network side device may send first indication information to the user equipment. The first indication information indicates time-frequency resources occupied by the user equipment to receive the first data sent by the first network side device and the second data sent by the second network side device. The first network side device may further send second indication information to the second network side device. The second indication information indicates the time-frequency resources occupied by the second network side device to send the second data.

Specifically, the first network side device sends the first indication information to the user equipment. The first indication information may include a first silence indication field. The first silence indication field is used to indicate a time-frequency resource that is not occupied by the first network side device when sending the first data and a time-frequency resource that is not occupied by the second network side device when sending the second data. For example, the first silence indication field may occupy two bits. To be specific, the first silence indication field may be 10, indicating that the first network side device and the second network side device perform rate matching on a specific RE. Specifically, the first network side device does not transmit data on the third RE, and an RE that is in a symbol preceding the third RE and that is in a same subcarrier as the third RE is used by the second network side device to send the second demodulation reference signal(s). In addition, the second network side device does not transmit data on the fourth RE, and an RE that is in a symbol following the fourth RE and that is in a same subcarrier as the fourth RE is used by the first network side device to send the first demodulation reference signal(s).

Correspondingly, the first network side device sends the second indication information to the second network side device. The second indication information includes a second silence indication field. The second silence indication field is used to indicate a time-frequency resource that is not occupied by the second network side device when transmitting the second data. Specifically, corresponding to the first silence indication field in the first indication information sent by the first network side device to the user equipment, when the first silence indication field is used to indicate that the first network side device and the second network side device perform rate matching on a specific RE; and specifically, indicate that the first network side device does not transmit data on the third RE, where the RE that is in the symbol preceding the third RE and that is in the same subcarrier as the third RE is used by the second network side device to send the second demodulation reference signal(s); and indicate that the second network side device does not transmit data on the fourth RE, where the RE that is in the symbol following the fourth RE and that is in the same subcarrier as the fourth RE is used by the first network side device to send the first demodulation reference signal(s), the second silence indication field is used to indicate that the second network side device does not transmit data on the fourth RE, and the RE that is in the symbol following the fourth RE and that is in the same subcarrier as the fourth RE is used by the first network side device to send the first demodulation reference signal(s).

It should be understood that, that the first data or the second data does not occupy a specific RE means that there is a silent RE. The silent RE that is not occupied by the sent data is processed in the following two manners:

One manner is as follows: For data on which encoding, modulation, and precoding processing are performed, when resource mapping is performed, data mapped to the silent RE is directly deleted, that is, the data on the corresponding RE is not to be sent. Correspondingly, when calculating an available RE for data transmission, the network side device does not remove the silent RE. In other words, the silent RE is still used as a valid RE to calculate a volume of data that can be transmitted.

The other manner is as follows: For data on which encoding, modulation, and precoding processing are performed, when resource mapping is performed, the silent RE is not matched, that is, the data is not to be mapped to the silent RE. Correspondingly, when calculating an available RE for data transmission, the network side device removes the silent RE. In other words, the silent RE is not used as a valid RE to calculate a volume of data that can be transmitted.

Therefore, silence processing is performed on an RE in a symbol preceding or following each of demodulation reference signal(s) sent by different network side devices, that is, rate matching is performed on the RE to avoid data transmission, so that when a time difference between moments at which the signals from the different network side devices arrive at the user equipment is relatively large, for example, is greater than a CP length, silence processing may be performed to further ensure orthogonality between the demodulation reference signal(s) sent by the plurality of network side devices. Therefore, interference between the data symbol and the demodulation reference signal is reduced.

In this application, to further ensure that signals sent by a plurality of network side devices can periodically and synchronously arrive at user equipment to ensure that there is no mutual crosstalk in time domain between demodulation reference signal(s) sent by a plurality of antenna ports, a demodulation reference signal sent by a first network side device and that sent by a second network side device may be further coordinated by increasing a CP length of the demodulation reference signal.

Figure 11:
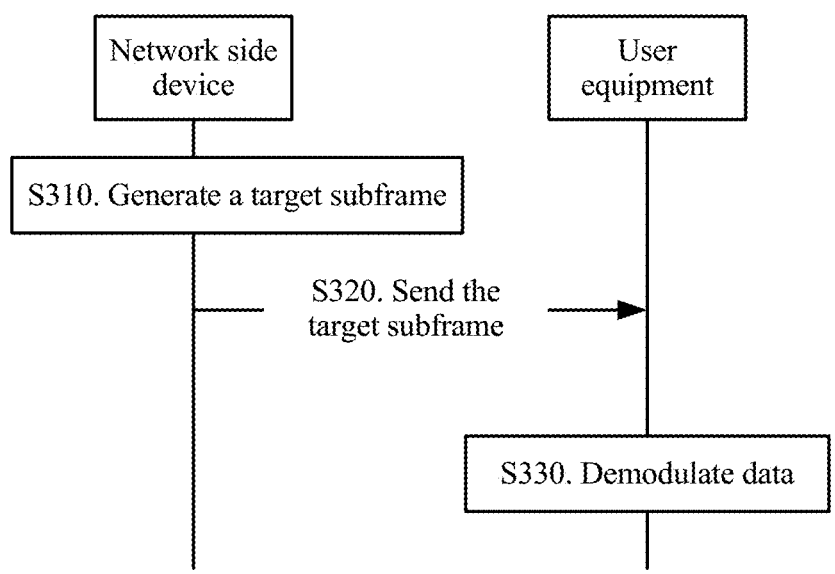
FIG. 11 is a schematic flowchart of a data transmission method according to this application.

Specifically, FIG. 11 shows a data transmission method 300 according to this application. The method 300 may be applied to the wireless communications system 100 shown in FIG. 1, and may be specifically applied to transmission between a single network side device and user equipment, or may be applied to coordinated multipoint transmission/reception between a plurality of network side devices and user equipment. This application is not limited thereto. Herein, any network side device is used as an example for description.

S310. A network side device generates a subframe, where in the subframe, a CP length of a time domain symbol used to carry a demodulation reference signal is greater than a CP length of a time domain symbol used to carry data.

Specifically, the network side device generates the subframe. The subframe is a special subframe. The subframe may be used to carry data and a demodulation reference signal, and a CP length of a time domain symbol occupied by the demodulation reference signal in the subframe is greater than a CP length of a time domain symbol occupied by the data. Optionally, in the subframe, a CP length of each time domain symbol used to carry a demodulation reference signal may be greater than a CP length of each time domain symbol used to carry data.

Specifically, in the prior art, each subframe occupies two timeslots, and each timeslot includes seven time domain symbols, six time domain symbols, or three symbols. A CP length of a time domain symbol used to carry data is equal to a CP length of a time domain symbol used to carry a user equipment-level demodulation reference signal. For example, for a normal CP, each timeslot includes seven time domain symbols. CP lengths of all the subsequent six time domain symbols other than the first time domain symbol are equal, and usually, the first time domain symbol is not used to carry a demodulation reference signal. For an extended CP, each timeslot may include six time domain symbols or three time domain symbols, and CP lengths of all the time domain symbols are still equal. The network side device may select subframes with different CP lengths based on different transmission scenarios, and may indicate a CP length of each time domain symbol in the subframe by sending indication information to user equipment.

In this application, a CP length of a symbol occupied by a demodulation reference signal may be set to be greater than a CP length of a symbol occupied by data. Specifically, a CP length of each symbol occupied by a demodulation reference signal may be set to be greater than the CP length of the symbol occupied by the data, or a CP length of each of only some symbols occupied by demodulation reference signal(s) may be set to be greater than the CP length of the symbol occupied by the data.

For example, in a coordinated multipoint transmission/reception scenario, to ensure that there is no mutual interference in time domain between demodulation reference signal(s) sent by a plurality of antenna ports, and to improve receive-end channel estimation performance and demodulation performance, the CP length of the symbol occupied by the demodulation reference signal may be set to be greater than the CP length of the symbol occupied by the data. For example, two consecutive time domain symbols occupied by a demodulation reference signal in the prior art may be combined into one time domain symbol. In this case, a CP length of the symbol occupied by the demodulation reference signal becomes double the CP length of the symbol occupied by the data.

Figure 12:
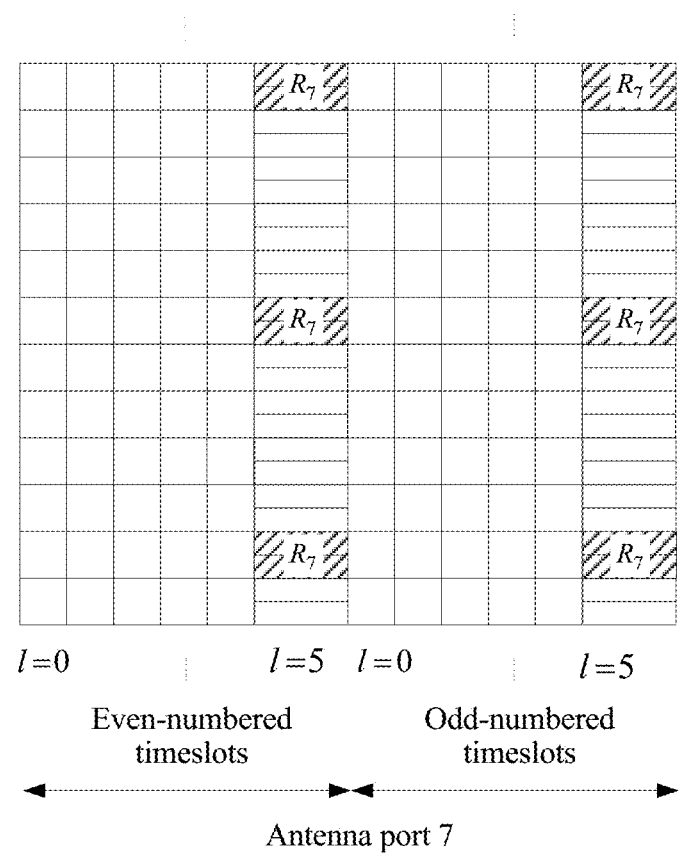
FIG. 12 is a schematic diagram of a special resource element RE according to this application.

Optionally, in an embodiment, two consecutive time domain symbols occupied by a demodulation reference signal in the prior art may be combined into one time domain symbol. In this case, an RE occupied by the demodulation reference signal is a special RE. A subcarrier spacing for the special RE may be changed to ensure unchanged bandwidth. For example, in a normal-CP scenario, the subcarrier spacing is changed from existing 15 KHz to 7.5 KHz, and duration is changed from 2192 time sampling points to 4384 time sampling points. In this way, a CP length becomes double an existing CP length of a demodulation reference signal, for example, is changed from 144 time sampling points to 288 time sampling points. For example, in FIG. 12, for a frequency division duplex (Frequency Division Duplex, FDD) frame structure, an antenna port 7 is used as an example, and REs for transmitting demodulation reference signal(s) become special REs, as shown in shaded grids in FIG. 12. Correspondingly, an orthogonal cover code (OCC) allocation manner may also be changed, so that two adjacent special REs in frequency domain and two symbols in time domain jointly form one OCC CDM combination. Similarly, for a time division duplex (Time Division Duplex, TDD) frame structure, although time-frequency resource locations occupied by demodulation reference signal(s) are different from those in the FDD frame structure, two consecutive time domain symbols occupied by a demodulation reference signal in the prior art may also be combined into one time domain symbol, so that a CP length of the symbol occupied by the demodulation reference signal becomes double the CP length of the symbol occupied by the data.

Optionally, to improve accuracy of measuring a channel status by a user during coordinated multipoint transmission/reception, a CP length corresponding to a symbol occupied by a channel measurement reference signal (Channel State Information-Reference Signal, CSI-RS) used for channel measurement may also be set to be greater than the CP length of the symbol occupied by the data. For example, two consecutive time domain symbols occupied by the CSI-RS may be combined into one time domain symbol. In this case, a CP length of the symbol occupied by the CSI-RS also becomes double that of the symbol occupied by the data.

It should be understood that because a part of a data signal may also be sent in each time domain symbol occupied by the demodulation reference signal in the subframe, the CP length of the time domain symbol occupied by the demodulation reference signal in the subframe is greater than the CP length of the time domain symbol occupied by the data. The time domain symbol herein occupied by the data is a time domain symbol that carries only data, but is not a time domain symbol that carries both data and a demodulation reference signal. However, the time domain symbol herein occupied by the demodulation reference signal in the subframe may carry a part of the data. Likewise, the time domain symbol occupied by the CSI-RS may also carry a part of the data. However, in a subframe, a CP length corresponding to a symbol occupied by a CSI-RS is set to be greater than a CP length of a symbol occupied by data. The symbol herein occupied by the data is a symbol that carries only data, but does not include a symbol that carries both a CSI-RS and data. However, the symbol herein occupied by the CSI-RS may carry a part of the data.

Therefore, in a coordinated multipoint scenario, the CP length of the demodulation reference signal is increased, so that when a time difference between moments at which demodulation reference signal(s) sent by the plurality of network side devices arrive at the UE is greater than the existing CP length of the demodulation reference signal, orthogonality between the demodulation reference signal(s) can be ensured, interference between the demodulation reference signal(s) and interference between a data symbol and the demodulation reference signal can be reduced, and channel estimation precision and data demodulation performance can be improved.

S320. The network side device sends the subframe to user equipment.

Specifically, the network side device generates the subframe. In the subframe, the CP length of the symbol occupied by the demodulation reference signal is greater than the CP length of the symbol occupied by the data. The network side device may send indication information to the user equipment; and indicate, by using the indication information, that CP lengths in the subframe are not equal. For example, a new indication field may be added to a PDCCH, or a new indication field may be added to higher layer signaling, to indicate to the user equipment that the CP lengths in the subframe are not equal. The network side device sends the subframe to the user equipment.

S330. The user equipment receives the subframe sent by the network side device, and performs demodulation processing on the data based on the demodulation reference signal in the subframe.

Therefore, according to the data transmission method in this application, the data and the demodulation reference signal are carried by using the subframe; and in the subframe, the CP length of each symbol that carries the data is less than the CP length of each symbol that carries the demodulation reference signal, so that inter-symbol interference is reduced.

In addition, when the time difference between the moments at which the demodulation reference signal(s) sent by the plurality of network side devices arrive at the UE is greater than the existing CP length of the demodulation reference signal, orthogonality between the demodulation reference signal(s) can be ensured, interference between the demodulation reference signal(s) and interference between the data symbol and the demodulation reference signal can be reduced, and channel estimation precision and data demodulation performance can be improved.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of this application.

The foregoing describes in detail the coordinated multipoint transmission/reception methods according to this application with reference to FIG. 1 to FIG. 12. The following describes a coordinated multipoint transmission/reception apparatus according to this application with reference to FIG. 13 to FIG. 20.

Figure 13:
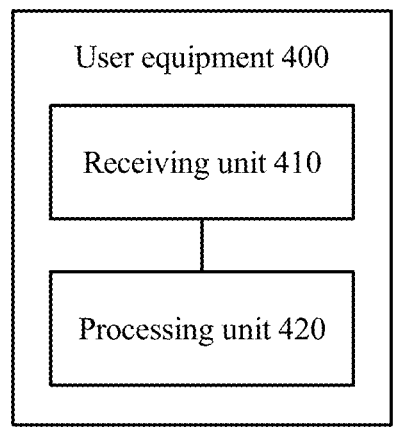
FIG. 13 is a schematic block diagram of user equipment according to this application.

As shown in FIG. 13, user equipment 400 according to this application includes a receiving unit 410 and a processing unit 420.

The receiving unit 410 is configured to receive, in a subframe, first data and first demodulation reference signal(s) that are sent by a first network side device by using n antenna port(s).

The receiving unit 410 is further configured to receive, in the subframe, second data and second demodulation reference signal(s) that are sent by a second network side device by using m antenna port(s). Time-frequency resources occupied by the n antenna port(s) to send the first demodulation reference signal(s) are different from time-frequency resources occupied by the m antenna port(s) to send the second demodulation reference signal(s), n and m are positive integers, and a time-frequency resource occupied by the first data and that occupied by the second data at least partly overlap.

The processing unit 420 is configured to perform demodulation processing on the first data and/or the second data based on the first demodulation reference signal(s) and the second demodulation reference signal(s).

Therefore, the user equipment in this application receives data and demodulation reference signal(s) sent by different network side devices by using different antenna ports. In coordinated multipoint transmission/reception in which a plurality of network side devices that are not quasi-co-located simultaneously send data to the user equipment, for a problem that there are different frequency offsets when the signals sent by the different network side devices arrive at the user equipment, the user equipment may provide independent frequency offset compensation, and ensure orthogonality between demodulation reference signal(s) from the plurality of network side devices.

Optionally, the first data is obtained by performing layer mapping and precoding processing on a first code word by the first network side device, and the first code word is obtained by performing modulation and coding processing on first original data by the first network side device by using a first modulation and coding scheme. The second data is obtained by performing layer mapping and precoding processing on a second code word by the second network side device, and the second code word is obtained by performing modulation and coding processing on second original data by the second network side device by using a second modulation and coding scheme.

Optionally, the receiving unit 410 is further configured to receive first indication information. The first indication information indicates the time-frequency resource occupied by the first data sent by the first network side device and the time-frequency resource occupied by the second data sent by the second network side device.

Optionally, the first indication information further includes a silence indication field. The silence indication field is used to indicate that the first data sent by the first network side device does not occupy a first resource element RE, and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s). Alternatively, the silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s). Alternatively, the silence indication field is used to indicate that there is no unoccupied RE for the first network side device and the second network side device.

Optionally, the receiving unit 410 is further configured to receive second indication information sent by the first network side device. The second indication information indicates a quantity n of transmission layers for the first code word and/or a quantity m of transmission layers for the second code word.

Optionally, the first code word is mapped to a layer 0 to a layer n−1, the layer 0 to the layer n−1 are mapped to the first n antenna port(s) in a first antenna port set of the first network side device in order, the first n antenna port(s) are the n antenna port(s), antenna ports in the first antenna port set are arranged according to a preset rule, and n is less than or equal to a quantity of antenna ports in the first antenna port set. The second code word is mapped to a layer n to a layer n+m−1, the layer n to the layer n+m−1 are mapped to the first m antenna port(s) in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

It should be understood that the user equipment 400 according to this application may be corresponding to the user equipment in the method 200 in this application, and the foregoing and other operations and/or functions of the units in the user equipment 400 are separately intended to implement corresponding procedures performed by the user equipment in the method in FIG. 2. For brevity, details are not described herein again.

Therefore, the user equipment in this application receives the data and the demodulation reference signal(s) sent by the different network side devices by using the different antenna ports. In coordinated multipoint transmission/reception in which the plurality of network side devices that are not quasi-co-located simultaneously send data to the user equipment, for the problem that there are different frequency offsets when the signals sent by the different network side devices arrive at the user equipment, the user equipment may provide independent frequency offset compensation, and ensure the orthogonality between the demodulation reference signal(s) from the plurality of network side devices.

Figure 14:
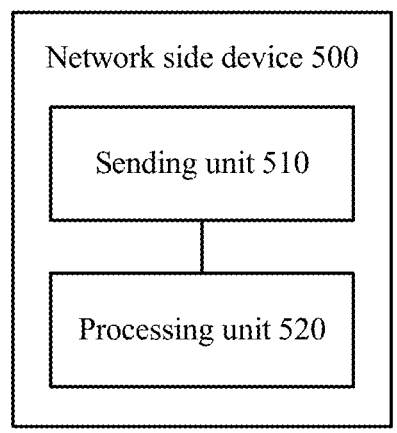
FIG. 14 is a schematic block diagram of a network side device according to this application.

As shown in FIG. 14, a network side device 500 according to this application includes:

a sending unit 510, configured to send first data and first demodulation reference signal(s) to user equipment in a subframe by using n antenna port(s).

The subframe is used by a second network side device to send second data and second demodulation reference signal(s) to the user equipment by using m antenna port(s), time-frequency resources occupied by the m antenna port(s) to send the second demodulation reference signal(s) do not carry time-frequency resources occupied by the n antenna port(s) to send the first demodulation reference signal(s), n and m are positive integers, at least a part of a time-frequency resource occupied by the first data also carries the second data, and the first demodulation reference signal(s) and the second demodulation reference signal(s) are used by the user equipment to perform demodulation processing on the first data and/or the second data.

Therefore, according to the network side device in this application, different network side devices send demodulation reference signal(s) to same user equipment by using different antenna ports. The network side device may be applied to coordinated multipoint transmission/reception in which a plurality of network side devices that are not quasi-co-located simultaneously send data to the user equipment. For a problem that there are different frequency offsets when the signals sent by the different network side devices arrive at the user equipment, the user equipment may provide independent frequency offset compensation, and ensure orthogonality between demodulation reference signal(s) from the plurality of network side devices.

Optionally, the network side device 500 further includes: a processing unit 520, configured to perform modulation and coding processing on first original data by using a first modulation and coding scheme, to obtain a first code word. The processing unit is further configured to perform layer mapping and precoding processing on the first code word to obtain the first data.

Optionally, the sending unit 510 is further configured to send first indication information to the user equipment. The first indication information indicates the time-frequency resource occupied by the first data and a time-frequency resource occupied by the second data.

Optionally, the first indication information further includes a first silence indication field. The first silence indication field is used to indicate that the first data sent by the first network side device does not occupy a first resource element RE, and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s). Alternatively, the first silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s). Alternatively, the first silence indication field is used to indicate that there is no unoccupied RE for the first network side device and the second network side device.

Optionally, the sending unit 510 is further configured to: determine, by the network side device, the first indication information and second indication information when a second moment at which a signal sent by the network side device at a first moment arrives at the user equipment is later than a third moment at which a signal sent by the second network side device at the first moment arrives at the user equipment, and when a time difference between the second moment and the third moment is greater than or equal to a preset time period, where the first indication information includes the first silence indication field; the first silence indication field is used to indicate that the first data sent by the network side device does not occupy the first resource element RE, and that the second data sent by the second network side device does not occupy the second RE; the RE that is in the symbol following the first RE and that is at the same frequency domain resource location as the first RE is used to carry the second demodulation reference signal(s); the RE that is in the symbol preceding the second RE and that is at the same frequency domain resource location as the second RE is used to carry the first demodulation reference signal(s); the second indication information includes a second silence indication field; and the second silence indication field is used to indicate that the second data sent by the second network side device does not occupy the second RE; and send, by the network side device, the second indication information to the second network side device.

Optionally, the network side device determines the first indication information and second indication information when a second moment at which a signal sent by the network side device at a first moment arrives at the user equipment is earlier than a third moment at which a signal sent by the second network side device at the first moment arrives at the user equipment, and when a time difference between the second moment and the third moment is greater than or equal to a preset time period. The first indication information includes a third silence indication field; the third silence indication field is used to indicate that the first data sent by the network side device does not occupy the third RE, and that the second data sent by the second network side device does not occupy the fourth RE; the RE that is in the symbol preceding the third RE and that is at the same frequency domain resource location as the third RE is used to carry the second demodulation reference signal(s); the RE that is in the symbol following the fourth RE and that is at the same frequency domain resource location as the fourth RE is used to carry the first demodulation reference signal(s); the second indication information includes a fourth silence indication field; and the fourth silence indication field is used to indicate that the second data sent by the second network side device does not occupy the fourth RE. The network side device sends the second indication information to the second network side device.

Optionally, the sending unit 510 is further configured to send third indication information to the user equipment. The third indication information indicates a quantity n of transmission layers for the first code word and/or a quantity m of transmission layers for the second code word.

Optionally, the first code word is mapped to a layer 0 to a layer n−1, the layer 0 to the layer n−1 are mapped to the first n antenna port(s) in a first antenna port set of the network side device in order, the first n antenna port(s) are the n antenna port(s), antenna ports in the first antenna port set are arranged according to a preset rule, and n is less than or equal to a quantity of antenna ports in the first antenna port set. The second code word is mapped to a layer n to a layer n+m−1, the layer n to the layer n+m−1 are mapped to the first m ports in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

It should be understood that the network side device 500 according to this application may be corresponding to the first network side device in the method 200 in this application, and the foregoing and other operations and/or functions of the units in the network side device 500 are separately intended to implement corresponding procedures performed by the first network side device in the method in FIG. 2. For brevity, details are not described herein again.

Therefore, according to the network side device in this application, the different network side devices send the demodulation reference signal(s) to the same user equipment by using the different antenna ports. The network side device may be applied to coordinated multipoint transmission/reception in which the plurality of network side devices that are not quasi-co-located simultaneously send data to the user equipment. For the problem that there are different frequency offsets when the signals sent by the different network side devices arrive at the user equipment, the user equipment may provide independent frequency offset compensation, and ensure the orthogonality between the demodulation reference signal(s) from the plurality of network side devices.

Figure 15:
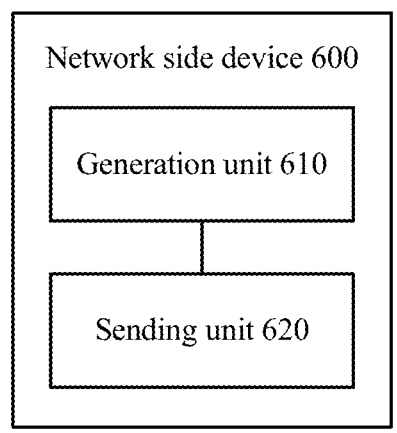
FIG. 15 is a schematic block diagram of a network side device according to another embodiment of this application.

As shown in FIG. 15, a network side device 600 according to this application includes:

a generation unit 610, configured to generate a subframe, where in the subframe, a cyclic prefix CP length of a time domain symbol used to carry a demodulation reference signal is greater than a CP length of a time domain symbol used to carry data; and a sending unit 620, configured to send the subframe to user equipment.

Therefore, according to the network side device in this application, the data and the demodulation reference signal are carried by using the subframe; and in the subframe, the CP length of the symbol that carries the data is less than the CP length of the symbol that carries the demodulation reference signal, so that inter-symbol interference can be reduced.

Optionally, in the subframe, a CP length of each time domain symbol used to carry a demodulation reference signal is greater than a CP length of each time domain symbol used to carry data.

Optionally, the sending unit 620 is further configured to send first data and first demodulation reference signal(s) to the user equipment in the subframe by using n antenna port(s). In addition, the subframe is further used by a second network side device to send second data and second demodulation reference signal(s) to the user equipment by using m antenna port(s), n and m are positive integers, a time-frequency resource occupied by the first data and that occupied by the second data at least partly overlap, and the first demodulation reference signal(s) and the second demodulation reference signal(s) are used by the user equipment to perform demodulation processing on the first data and/or the second data.

Optionally, in the subframe, the CP length of the time domain symbol used to carry the demodulation reference signal is double the CP length of the time domain symbol used to carry the data.

Optionally, in the subframe, a subcarrier spacing for the time domain symbol used to carry the user equipment-level demodulation reference signal is different from a subcarrier spacing for the time domain symbol used to carry the data.

Optionally, when in the subframe, the CP length of the time domain symbol used to carry the demodulation reference signal is double the CP length of the time domain symbol used to carry the data, the subcarrier spacing for the time domain symbol used to carry the user equipment-level demodulation reference signal is half of the subcarrier spacing for the time domain symbol used to carry the data.

Optionally, in the subframe, a CP length of a time domain symbol used to carry a channel measurement reference signal CSI-RS is greater than the CP length of the time domain symbol used to carry the data.

It should be understood that the network side device 600 according to this application may be corresponding to the network side device in the method 300 in this application, and the foregoing and other operations and/or functions of the units in the network side device 600 are separately intended to implement corresponding procedures performed by the network side device in the method in FIG. 11. For brevity, details are not described herein again.

Therefore, according to the network side device in this application, the data and the demodulation reference signal are carried by using the subframe; and in the subframe, the CP length of the symbol that carries the data is less than the CP length of the symbol that carries the demodulation reference signal, so that the inter-symbol interference can be reduced. In addition, when a time difference between moments at which demodulation reference signal(s) sent by a plurality of network side devices arrive at the UE is greater than an existing CP length of the demodulation reference signal, orthogonality between the demodulation reference signal(s) can be ensured, interference between the demodulation reference signal(s) and interference between a data symbol and the demodulation reference signal can be reduced, and channel estimation precision and data demodulation performance can be improved.

Figure 16:
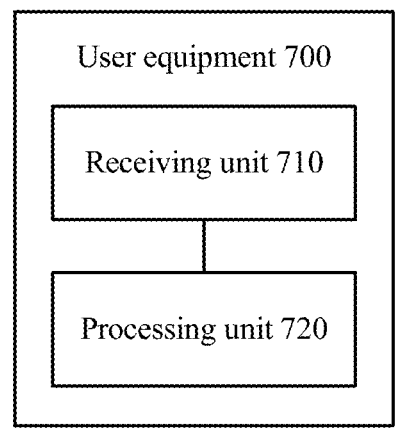
FIG. 16 is a schematic block diagram of user equipment according to another embodiment of this application.

As shown in FIG. 16, user equipment 700 according to this application includes: a receiving unit 710, configured to receive a subframe sent by a network side device, where in the subframe, a cyclic prefix CP length of a time domain symbol used to carry a demodulation reference signal is greater than a CP length of a time domain symbol used to carry data; and a processing unit 720, configured to perform demodulation processing on the data based on the demodulation reference signal.

Therefore, the user equipment in this application receives the subframe that carries the data and the demodulation reference signal; and in the subframe, the CP length of the symbol that carries the data is less than the CP length of the symbol that carries the demodulation reference signal, so that inter-symbol interference can be reduced.

Optionally, in the subframe, a CP length of each time domain symbol used to carry a demodulation reference signal is greater than a CP length of each time domain symbol used to carry data.

Optionally, the receiving unit 710 is further configured to: receive, in the subframe, first data and first demodulation reference signal(s) that are sent by a first network side device by using n antenna port(s), and second data and second demodulation reference signal(s) that are sent by a second network side device by using m antenna port(s), where n and m are positive integers, and a time-frequency resource occupied by the first data and that occupied by the second data at least partly overlap. The user equipment performs demodulation processing on the first data and/or the second data based on the first demodulation reference signal(s) and the second demodulation reference signal(s).

Optionally, in the subframe, the CP length of the time domain symbol used to carry the demodulation reference signal is double the CP length of the time domain symbol used to carry the data.

Optionally, in the subframe, a subcarrier spacing for the time domain symbol used to carry the user equipment-level demodulation reference signal is different from a subcarrier spacing for the time domain symbol used to carry the data.

Optionally, in the subframe, a CP length of a time domain symbol used to carry a channel measurement reference signal CSI-RS is greater than the CP length of the time domain symbol used to carry the data.

It should be understood that the user equipment 700 according to this application may be corresponding to the user equipment in the method 300 in this application, and the foregoing and other operations and/or functions of the units in the user equipment 700 are separately intended to implement corresponding procedures performed by the user equipment in the method in FIG. 11. For brevity, details are not described herein again.

Therefore, the user equipment in this application receives the subframe that carries the data and the demodulation reference signal; and in the subframe, the CP length of the symbol that carries the data is less than the CP length of the symbol that carries the demodulation reference signal, so that the inter-symbol interference can be reduced. In addition, when a time difference between moments at which demodulation reference signal(s) sent by a plurality of network side devices arrive at the UE is greater than an existing CP length of the demodulation reference signal, orthogonality between the demodulation reference signal(s) can be ensured, interference between the demodulation reference signal(s) and interference between a data symbol and the demodulation reference signal can be reduced, and channel estimation precision and data demodulation performance can be improved.

Figure 17:
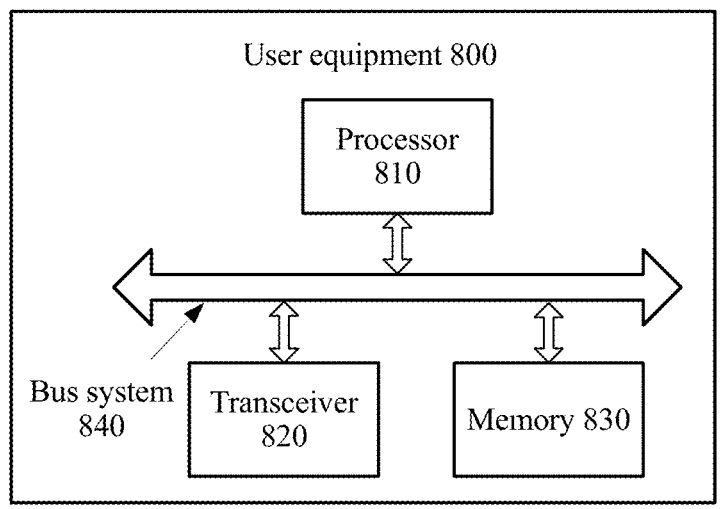
FIG. 17 is a schematic block diagram of user equipment according to still another embodiment of this application.

FIG. 17 is a schematic block diagram of user equipment 800 according to this application. As shown in FIG. 17, the user equipment 800 includes a processor 810 and a transceiver 820. The processor 810 is connected to the transceiver 820. Optionally, the user equipment 800 further includes a memory 830. The memory 830 is connected to the processor 810. Further, optionally, the user equipment 800 includes a bus system 840. The processor 810, the memory 830, and the transceiver 820 may be connected by using the bus system 840. The memory 830 may be configured to store an instruction. The processor 810 is configured to execute the instruction stored in the memory 830, so as to control the transceiver 820 to send information or a signal.

The transceiver 820 is configured to: receive, in a subframe, first data and first demodulation reference signal(s) that are sent by a first network side device by using n antenna port(s); and receive, in the subframe, second data and second demodulation reference signal(s) that are sent by a second network side device by using m antenna port(s). Time-frequency resources occupied by the n antenna port(s) to send the first demodulation reference signal(s) are different from time-frequency resources occupied by the m antenna port(s) to send the second demodulation reference signal(s), n and m are positive integers, and a time-frequency resource occupied by the first data and that occupied by the second data at least partly overlap. The processor 810 is configured to perform demodulation processing on the first data and/or the second data based on the first demodulation reference signal(s) and the second demodulation reference signal(s).

Therefore, the user equipment in this application receives data and demodulation reference signal(s) sent by different network side devices by using different antenna ports. In coordinated multipoint transmission/reception in which a plurality of network side devices that are not quasi-co-located simultaneously send data to the user equipment, for a problem that there are different frequency offsets when the signals sent by the different network side devices arrive at the user equipment, the user equipment may provide independent frequency offset compensation, and ensure orthogonality between demodulation reference signal(s) from the plurality of network side devices.

Optionally, the first data is obtained by performing layer mapping and precoding processing on a first code word by the first network side device, and the first code word is obtained by performing modulation and coding processing on first original data by the first network side device by using a first modulation and coding scheme. The second data is obtained by performing layer mapping and precoding processing on a second code word by the second network side device, and the second code word is obtained by performing modulation and coding processing on second original data by the second network side device by using a second modulation and coding scheme.

Optionally, the transceiver 820 is configured to receive first indication information. The first indication information indicates the time-frequency resource occupied by the first data sent by the first network side device and the time-frequency resource occupied by the second data sent by the second network side device.

Optionally, the first indication information further includes a silence indication field. The silence indication field is used to indicate that the first data sent by the first network side device does not occupy a first resource element RE, and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s). Alternatively, the silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s). Alternatively, the silence indication field is used to indicate that there is no unoccupied RE for the first network side device and the second network side device.

Optionally, the transceiver 820 is further configured to receive second indication information sent by the first network side device. The second indication information indicates a quantity n of transmission layers for the first code word and/or a quantity m of transmission layers for the second code word.

Optionally, the first code word is mapped to a layer 0 to a layer n−1, the layer 0 to the layer n−1 are mapped to the first n antenna port(s) in a first antenna port set of the first network side device in order, the first n antenna port(s) are the n antenna port(s), antenna ports in the first antenna port set are arranged according to a preset rule, and n is less than or equal to a quantity of antenna ports in the first antenna port set. The second code word is mapped to a layer n to a layer n+m−1, the layer n to the layer n+m−1 are mapped to the first m antenna port(s) in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

It should be understood that the user equipment 800 according to this application may be corresponding to the user equipment 400 in this application, and may be corresponding to the user equipment that performs the method 200 according to this application; and the foregoing and other operations and/or functions of the modules in the user equipment 800 are separately intended to implement corresponding procedures performed by the user equipment in the method in FIG. 2. For brevity, details are not described herein again.

Therefore, the user equipment in this application receives the data and the demodulation reference signal(s) sent by the different network side devices by using the different antenna ports. In coordinated multipoint transmission/reception in which the plurality of network side devices that are not quasi-co-located simultaneously send data to the user equipment, for the problem that there are different frequency offsets when the signals sent by the different network side devices arrive at the user equipment, the user equipment may provide independent frequency offset compensation, and ensure the orthogonality between the demodulation reference signal(s) from the plurality of network side devices.

Figure 18:
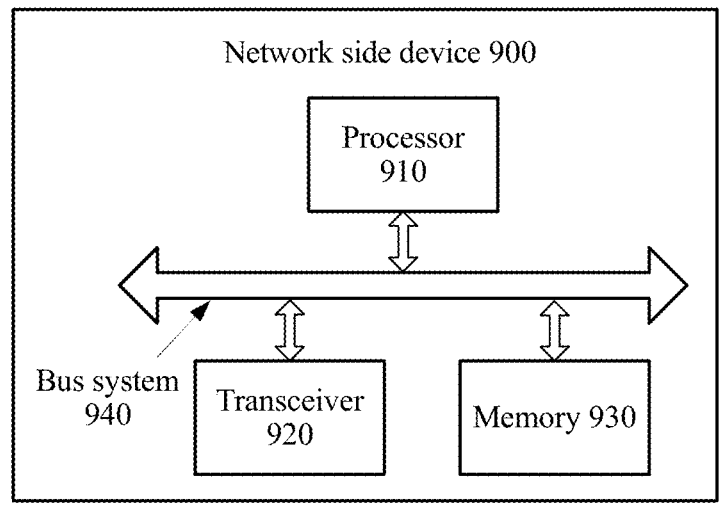
FIG. 18 is a schematic block diagram of a network side device according to still another embodiment of this application.

FIG. 18 is a schematic block diagram of a network side device 900 according to this application. As shown in FIG. 18, the network side device 900 includes a processor 910 and a transceiver 920. The processor 910 is connected to the transceiver 920. Optionally, the network side device 900 further includes a memory 930. The memory 930 is connected to the processor 910. Further, optionally, the network side device 900 includes a bus system 940. The processor 910, the memory 930, and the transceiver 920 may be connected by using the bus system 940. The memory 930 may be configured to store an instruction. The processor 910 is configured to execute the instruction stored in the memory 930, so as to control the transceiver 920 to send information or a signal.

The transceiver 920 is configured to send first data and first demodulation reference signal(s) to user equipment in a subframe by using n antenna port(s). The subframe is used by a second network side device to send second data and second demodulation reference signal(s) to the user equipment by using m antenna port(s), time-frequency resources occupied by the m antenna port(s) to send the second demodulation reference signal(s) do not carry time-frequency resources occupied by the n antenna port(s) to send the first demodulation reference signal(s), n and m are positive integers, at least a part of a time-frequency resource occupied by the first data also carries the second data, and the first demodulation reference signal(s) and the second demodulation reference signal(s) are used by the user equipment to perform demodulation processing on the first data and/or the second data.

Therefore, according to the network side device in this application, different network side devices send demodulation reference signal(s) to same user equipment by using different antenna ports. The network side device may be applied to coordinated multipoint transmission/reception in which a plurality of network side devices that are not quasi-co-located simultaneously send data to the user equipment. For a problem that there are different frequency offsets when the signals sent by the different network side devices arrive at the user equipment, the user equipment may provide independent frequency offset compensation, and ensure orthogonality between demodulation reference signal(s) from the plurality of network side devices.

Optionally, the processor 910 is configured to perform modulation and coding processing on first original data by using a first modulation and coding scheme, to obtain a first code word; and perform layer mapping and precoding processing on the first code word to obtain the first data.

Optionally, the transceiver 920 is configured to send first indication information to the user equipment. The first indication information indicates the time-frequency resource occupied by the first data and a time-frequency resource occupied by the second data. Optionally, the first indication information further includes a first silence indication field. The first silence indication field is used to indicate that the first data sent by the first network side device does not occupy a first resource element RE, and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s). Alternatively, the first silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s). Alternatively, the first silence indication field is used to indicate that there is no unoccupied RE for the first network side device and the second network side device.

Optionally, the transceiver 920 is configured to: determine, by the network side device, the first indication information and second indication information when a second moment at which a signal sent by the network side device at a first moment arrives at the user equipment is later than a third moment at which a signal sent by the second network side device at the first moment arrives at the user equipment, and when a time difference between the second moment and the third moment is greater than or equal to a preset time period, where the first indication information includes the first silence indication field; the first silence indication field is used to indicate that the first data sent by the network side device does not occupy the first resource element RE, and that the second data sent by the second network side device does not occupy the second RE; the RE that is in the symbol following the first RE and that is at the same frequency domain resource location as the first RE is used to carry the second demodulation reference signal(s); the RE that is in the symbol preceding the second RE and that is at the same frequency domain resource location as the second RE is used to carry the first demodulation reference signal(s); the second indication information includes a second silence indication field; and the second silence indication field is used to indicate that the second data sent by the second network side device does not occupy the second RE; and send, by the network side device, the second indication information to the second network side device.

Optionally, the network side device determines the first indication information and second indication information when a second moment at which a signal sent by the network side device at a first moment arrives at the user equipment is earlier than a third moment at which a signal sent by the second network side device at the first moment arrives at the user equipment, and when a time difference between the second moment and the third moment is greater than or equal to a preset time period. The first indication information includes a third silence indication field; the third silence indication field is used to indicate that the first data sent by the network side device does not occupy the third RE, and that the second data sent by the second network side device does not occupy the fourth RE; the RE that is in the symbol preceding the third RE and that is at the same frequency domain resource location as the third RE is used to carry the second demodulation reference signal(s); the RE that is in the symbol following the fourth RE and that is at the same frequency domain resource location as the fourth RE is used to carry the first demodulation reference signal(s); the second indication information includes a fourth silence indication field; and the fourth silence indication field is used to indicate that the second data sent by the second network side device does not occupy the fourth RE. The network side device sends the second indication information to the second network side device.

Optionally, the transceiver 920 is configured to send third indication information to the user equipment. The third indication information indicates a quantity n of transmission layers for the first code word and/or a quantity m of transmission layers for the second code word.

Optionally, the first code word is mapped to a layer 0 to a layer n−1, the layer 0 to the layer n−1 are mapped to the first n antenna port(s) in a first antenna port set of the network side device in order, the first n antenna port(s) are the n antenna port(s), antenna ports in the first antenna port set are arranged according to a preset rule, and n is less than or equal to a quantity of antenna ports in the first antenna port set. The second code word is mapped to a layer n to a layer n+m−1, the layer n to the layer n+m−1 are mapped to the first m ports in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

It should be understood that the network side device 900 according to this application may be corresponding to the network side device 500 in this application, and may be corresponding to the first network side device that performs the method 200 according to this application; and the foregoing and other operations and/or functions of the modules in the network side device 900 are separately intended to implement corresponding procedures performed by the first network side device in the method in FIG. 2. For brevity, details are not described herein again.

Therefore, according to the network side device in this application, the different network side devices send the demodulation reference signal(s) to the same user equipment by using the different antenna ports. The network side device may be applied to coordinated multipoint transmission/reception in which the plurality of network side devices that are not quasi-co-located simultaneously send data to the user equipment. For the problem that there are different frequency offsets when the signals sent by the different network side devices arrive at the user equipment, the user equipment may provide independent frequency offset compensation, and ensure the orthogonality between the demodulation reference signal(s) from the plurality of network side devices.

Figure 19:
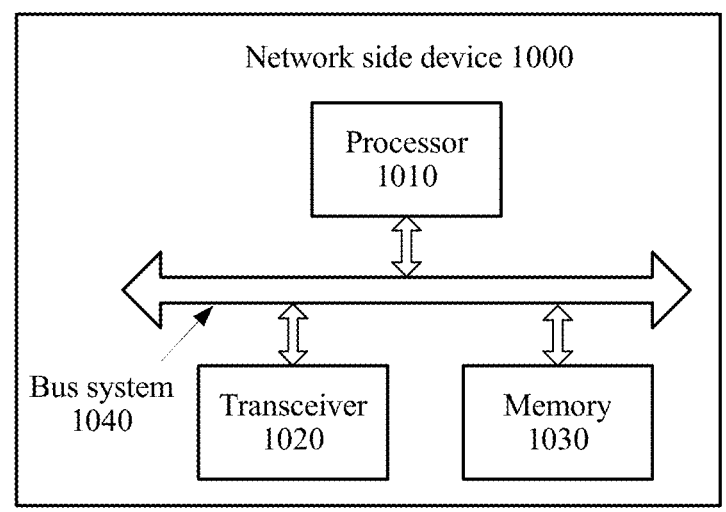
FIG. 19 is a schematic block diagram of a network side device according to still another embodiment of this application.

FIG. 19 is a schematic block diagram of a network side device 1000 according to this application. As shown in FIG. 19, the network side device 1000 includes a processor 1010 and a transceiver 1020. The processor 1010 is connected to the transceiver 1020. Optionally, the network side device 1000 further includes a memory 1030. The memory 1030 is connected to the processor 1010. Further, optionally, the network side device 1000 includes a bus system 1040. The processor 1010, the memory 1030, and the transceiver 1020 may be connected by using the bus system 1040. The memory 1030 may be configured to store an instruction. The processor 1010 is configured to execute the instruction stored in the memory 1030, so as to control the transceiver 1020 to send information or a signal.

The processor 1010 is configured to generate a subframe, where in the subframe, a cyclic prefix CP length of a time domain symbol used to carry a demodulation reference signal is greater than a CP length of a time domain symbol used to carry data. The transceiver 1020 is configured to send the subframe to user equipment.

Therefore, according to the network side device in this application, the data and the demodulation reference signal are carried by using the subframe; and in the subframe, the CP length of the symbol that carries the data is less than the CP length of the symbol that carries the demodulation reference signal, so that inter-symbol interference can be reduced.

Optionally, in the subframe, a CP length of each time domain symbol used to carry a demodulation reference signal is greater than a CP length of each time domain symbol used to carry data.

Optionally, the transceiver 1020 is configured to send first data and first demodulation reference signal(s) to the user equipment in the subframe by using n antenna port(s). In addition, the subframe is further used by a second network side device to send second data and second demodulation reference signal(s) to the user equipment by using m antenna port(s), n and m are positive integers, a time-frequency resource occupied by the first data and that occupied by the second data at least partly overlap, and the first demodulation reference signal(s) and the second demodulation reference signal(s) are used by the user equipment to perform demodulation processing on the first data and/or the second data.

Optionally, in the subframe, the CP length of the time domain symbol used to carry the demodulation reference signal is double the CP length of the time domain symbol used to carry the data.

Optionally, in the subframe, a subcarrier spacing for the time domain symbol used to carry the user equipment-level demodulation reference signal is different from a subcarrier spacing for the time domain symbol used to carry the data.

Optionally, when in the subframe, the CP length of the time domain symbol used to carry the demodulation reference signal is double the CP length of the time domain symbol used to carry the data, the subcarrier spacing for the time domain symbol used to carry the user equipment-level demodulation reference signal is half of the subcarrier spacing for the time domain symbol used to carry the data.

Optionally, in the subframe, a CP length of a time domain symbol used to carry a channel measurement reference signal CSI-RS is greater than the CP length of the time domain symbol used to carry the data.

It should be understood that the network side device 1000 according to this application may be corresponding to the network side device 600 in this application, and may be corresponding to the network side device that performs the method 300 according to this application; and the foregoing and other operations and/or functions of the modules in the network side device 1000 are separately intended to implement corresponding procedures performed by the network side device in the method in FIG. 11. For brevity, details are not described herein again.

Therefore, according to the network side device in this application, the data and the demodulation reference signal are carried by using the subframe; and in the subframe, the CP length of the symbol that carries the data is less than the CP length of the symbol that carries the demodulation reference signal, so that the inter-symbol interference can be reduced. In addition, when a time difference between moments at which demodulation reference signal(s) sent by a plurality of network side devices arrive at the UE is greater than an existing CP length of the demodulation reference signal, orthogonality between the demodulation reference signal(s) can be ensured, interference between the demodulation reference signal(s) and interference between a data symbol and the demodulation reference signal can be reduced, and channel estimation precision and data demodulation performance can be improved.

Figure 20:
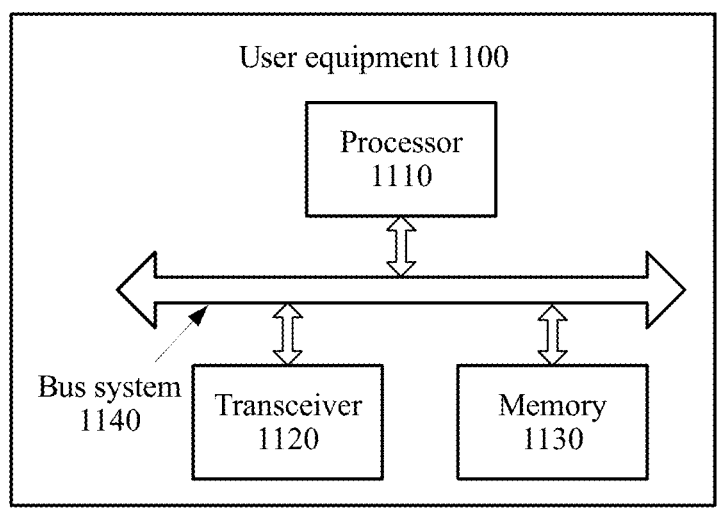
FIG. 20 is a schematic block diagram of user equipment according to still another embodiment of this application.

FIG. 20 is a schematic block diagram of user equipment 1100 according to this application. As shown in FIG. 20, the user equipment 1100 includes a processor 1110 and a transceiver 1120. The processor 1110 is connected to the transceiver 1120. Optionally, the user equipment 1100 further includes a memory 1130. The memory 1130 is connected to the processor 1110. Further, optionally, the user equipment 1100 includes a bus system 1140. The processor 1110, the memory 1130, and the transceiver 1120 may be connected by using the bus system 1140. The memory 1130 may be configured to store an instruction. The processor 1110 is configured to execute the instruction stored in the memory 1130, so as to control the transceiver 1120 to send information or a signal.

The transceiver 1120 is configured to receive a subframe sent by a network side device, where in the subframe, a cyclic prefix CP length of a time domain symbol used to carry a demodulation reference signal is greater than a CP length of a time domain symbol used to carry data. The processor 1110 is configured to perform demodulation processing on the data based on the demodulation reference signal.

Therefore, the user equipment in this application receives the subframe that carries the data and the demodulation reference signal; and in the subframe, the CP length of the symbol that carries the data is less than the CP length of the symbol that carries the demodulation reference signal, so that inter-symbol interference can be reduced.

Optionally, in the subframe, a CP length of each time domain symbol used to carry a demodulation reference signal is greater than a CP length of each time domain symbol used to carry data.

Optionally, the transceiver 1120 is further configured to: receive, in the subframe, first data and first demodulation reference signal(s) that are sent by a first network side device by using n antenna port(s), and second data and second demodulation reference signal(s) that are sent by a second network side device by using m antenna port(s), where n and m are positive integers, and a time-frequency resource occupied by the first data and that occupied by the second data at least partly overlap. The user equipment performs demodulation processing on the first data and/or the second data based on the first demodulation reference signal(s) and the second demodulation reference signal(s).

Optionally, in the subframe, the CP length of the time domain symbol used to carry the demodulation reference signal is double the CP length of the time domain symbol used to carry the data.

Optionally, in the subframe, a subcarrier spacing for the time domain symbol used to carry the user equipment-level demodulation reference signal is different from a subcarrier spacing for the time domain symbol used to carry the data.

Optionally, in the subframe, a CP length of each time domain symbol used to carry a channel measurement reference signal CSI-RS is greater than the CP length of each time domain symbol used to carry the data.

It should be understood that the user equipment 1100 according to this application may be corresponding to the user equipment 700 in this application, and may be corresponding to the user equipment that performs the method 300 according to this application; and the foregoing and other operations and/or functions of the modules in the user equipment 1100 are separately intended to implement corresponding procedures performed by the user equipment in the method in FIG. 11. For brevity, details are not described herein again.

Therefore, the user equipment in this application receives the subframe that carries the data and the demodulation reference signal; and in the subframe, the CP length of the symbol that carries the data is less than the CP length of the symbol that carries the demodulation reference signal, so that the inter-symbol interference can be reduced. In addition, when a time difference between moments at which demodulation reference signal(s) sent by a plurality of network side devices arrive at the UE is greater than an existing CP length of the demodulation reference signal, orthogonality between the demodulation reference signal(s) can be ensured, interference between the demodulation reference signal(s) and interference between a data symbol and the demodulation reference signal can be reduced, and channel estimation precision and data demodulation performance can be improved.

It may be understood that the network side device provided in the foregoing embodiments may further include a communications interface, configured to support communication between the network side device and another network side device, and the another network side device includes another network side device and/or a core network side device. This is not limited herein.

It should be noted that the foregoing method embodiments of this application may be applied to a processor, or be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logical device, a discrete gate or transistor logic device, or a discrete hardware component; and may implement or perform the methods, the steps, and logical block diagrams that are disclosed in this application. The general-purpose processor may be a microprocessor or the processor may be any conventional processor, or the like. Steps of the methods disclosed in this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAIVI), a synchronous link dynamic random access memory (Synchlink DRAM, SLDRAM), and a direct rambus dynamic random access memory (Direct Rambus RAM, DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network side device, or the like) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A coordinated multipoint transmission/reception method, comprising:
   receiving, in a subframe, first data and first demodulation reference signal(s) that are from a first network side device by using n antenna port(s);
   receiving, in the subframe, second data and second demodulation reference signal(s) that are from a second network side device by using m antenna port(s), wherein time-frequency resources occupied by the n antenna port(s) to send the first demodulation reference signal(s) are different from time-frequency resources occupied by the m antenna port(s) to send the second demodulation reference signal(s), n and m are positive integers, and a time-frequency resource occupied by the first data and that occupied by the second data at least partly overlap, the m antenna port(s) are not quasi co-located with the n antenna port(s); and
   performing demodulation processing on the first data and/or the second data based on the first demodulation reference signal(s) and the second demodulation reference signal(s);
   wherein the method further comprises:
   receiving first indication information from the first network side device, wherein the first indication information includes an indication of the time-frequency resource occupied by the first data from the first network side device and the time-frequency resource occupied by the second data from the second network side device; and
   determining the first indication information and second indication information when a second moment at which a signal sent by the first network side device at a first moment arrives at user equipment is later than a third moment at which a signal sent by the second network side device at the first moment arrives at the user equipment, and when a time difference between the second moment and the third moment is greater than or equal to a preset time period, or
   determining the first indication information and the second indication information when a second moment at which a signal sent by the first network side device at a first moment arrives at the user equipment is earlier than a third moment at which a signal sent by the second network side device at the first moment arrives at the user equipment, and when a time difference between the second moment and the third moment is greater than or equal to a preset time period.

2. The method according to claim 1, wherein
   the first data is obtained by performing layer mapping and precoding processing on a first code word by the first network side device, and the first code word is obtained by performing modulation and coding processing on first original data by the first network side device by using a first modulation and coding scheme; and the second data is obtained by performing layer mapping and precoding processing on a second code word by the second network side device, and the second code word is obtained by performing modulation and coding processing on second original data by the second network side device by using a second modulation and coding scheme.

3. The method according to claim 2, wherein the method further comprises:

receiving second indication information from the first network side device, wherein the second indication information indicates a quantity n of transmission layers for the first code word and/or a quantity m of transmission layers for the second code word.

4. The method according to claim 2, wherein the first code word is mapped to a layer 0 to a layer n−1, the layer 0 to the layer n−1 are mapped to the first n antenna port(s) in a first antenna port set of the first network side device in order, the first n antenna port(s) are the n antenna port(s), antenna ports in the first antenna port set are arranged according to a preset rule, and n is less than or equal to a quantity of antenna ports in the first antenna port set; and the second code word is mapped to a layer n to a layer n+m−1, the layer n to the layer n+m−1 are mapped to the first m antenna port(s) in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

5. The method according to claim 1, wherein the first indication information further comprises a silence indication field, wherein the silence indication field is used to indicate that the first data from the first network side device does not occupy a first resource element (RE), and that the second data from the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s); or the silence indication field is used to indicate that the first data from the first network side device does not occupy a third RE, and that the second data from the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s); or the silence indication field is used to indicate that there is no unoccupied RE for the first network side device and the second network side device.

6. The method according to claim 1, wherein the first indication information further comprises a first silence indication field, and wherein:

the first silence indication field is used to indicate that the first data sent by the first network side device does not occupy a first resource element (RE), and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s); or the first silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s); or the first silence indication field is used to indicate that there is no unoccupied RE for the first network side device and the second network side device.

7. The method according to claim 6, wherein:

in response to the processor of the first network side device determining the first indication information and second indication information when a second moment at which a signal sent by the network side device at a first moment arrives at the user equipment is later than a third moment at which a signal sent by the second network side device at the first moment arrives at the user equipment, and when a time difference between the second moment and the third moment is greater than or equal to a preset time period, wherein the first indication information comprises the first silence indication field; the first silence indication field is used to indicate that the first data sent by the network side device does not occupy the first resource element RE, and that the second data sent by the second network side device does not occupy the second RE; the RE that is in the symbol following the first RE and that is at the same frequency domain resource location as the first RE is used to carry the second demodulation reference signal(s); the RE that is in the symbol preceding the second RE and that is at the same frequency domain resource location as the second RE is used to carry the first demodulation reference signal(s); the second indication information comprises a second silence indication field; and the second silence indication field is used to indicate that the second data sent by the second network side device does not occupy the second RE; and sending, by the transmitter of the first network side device, the second indication information to the second network side device; or in response to the processor of the first network side device determining the first indication information and second indication information when a second moment at which a signal sent by the network side device at a first moment arrives at the user equipment is earlier than a third moment at which a signal sent by the second network side device at the first moment arrives at the user equipment, and when a time difference between the second moment and the third moment is greater than or equal to a preset time period, wherein the first indication information comprises a third silence indication field; the third silence indication field is used to indicate that the first data sent by the network side device does not occupy the third RE, and that the second data sent by the second network side device does not occupy the fourth RE; the RE that is in the symbol preceding the third RE and that is at the same frequency domain resource location as the third RE is used to carry the second demodulation reference signal(s); the RE that is in the symbol following the fourth RE and that is at the same frequency domain resource location as the fourth RE is used to carry the first demodulation reference signal(s); the second indication information comprises a fourth silence indication field; and the fourth silence indication field is used to indicate that the second data sent by the second network side device does not occupy the fourth RE; and sending, by the transmitter of the first network side device, the second indication information to the second network side device.

8. A communication apparatus, comprising:

a receiver, configured to receive, in a subframe, first data and first demodulation reference signal(s) that are from a first network side device by using n antenna port(s), wherein the receiver is further configured to receive, in the subframe, second data and second demodulation reference signal(s) that are from a second network side device by using m antenna port(s), wherein the m antenna port(s) are not quasi co-located with the n antenna port(s), time-frequency resources occupied by the n antenna port(s) to send the first demodulation reference signal(s) are different from time-frequency resources occupied by the m antenna port(s) to send the second demodulation reference signal(s), n and m are positive integers, and a time-frequency resource occupied by the first data and that occupied by the second data at least partly overlap; and a processor, configured to perform demodulation processing on the first data and/or the second data based on the first demodulation reference signal(s) and the second demodulation reference signal(s);

wherein the receiver is further configured to:

receive first indication information from the first network side device, wherein the first indication information includes an indication of the time-frequency resource occupied by the first data from the first network side device and the time-frequency resource occupied by the second data from the second network side device;

wherein a network side device either:

determines the first indication information and second indication information when a second moment at which a signal sent by the first network side device at a first moment arrives at the user equipment is later than a third moment at which a signal sent by the second network side device at the first moment arrives at the user equipment, and when a time difference between the second moment and the third moment is greater than or equal to a preset time period, or determines the first indication information and second indication information when a second moment at which a signal sent by the first network side device at a first moment arrives at the user equipment is earlier than a third moment at which a signal sent by the second network side device at the first moment arrives at the user equipment, and when a time difference between the second moment and the third moment is greater than or equal to a preset time period.

9. The communication apparatus according to claim 8, wherein the first data is obtained by performing layer mapping and precoding processing on a first code word by the first network side device, and the first code word is obtained by performing modulation and coding processing on first original data by the first network side device by using a first modulation and coding scheme; and the second data is obtained by performing layer mapping and precoding processing on a second code word by the second network side device, and the second code word is obtained by performing modulation and coding processing on second original data by the second network side device by using a second modulation and coding scheme.

10. The communication apparatus according to claim 9, wherein the receiver is further configured to:

receive second indication information from the first network side device, wherein the second indication information indicates a quantity n of transmission layers for the first code word and/or a quantity m of transmission layers for the second code word.

11. The communication apparatus according to claim 9, wherein the first code word is mapped to a layer 0 to a layer n−1, the layer 0 to the layer n−1 are mapped to the first n antenna port(s) in a first antenna port set of the first network side device in order, the first n antenna port(s) are the n antenna port(s), antenna ports in the first antenna port set are arranged according to a preset rule, and n is less than or equal to a quantity of antenna ports in the first antenna port set; and the second code word is mapped to a layer n to a layer n+m−1, the layer n to the layer n+m−1 are mapped to the first m antenna port(s) in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

12. The communication apparatus according to claim 8, wherein the first indication information further comprises a silence indication field, wherein the silence indication field is used to indicate that the first data from the first network side device does not occupy a first resource element (RE), and that the second data from the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s); or the silence indication field is used to indicate that the first data from the first network side device does not occupy a third RE, and that the second data from the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s); or the silence indication field is used to indicate that there is no unoccupied RE for the first network side device and the second network side device.

13. The communication apparatus according to claim 8, wherein the first indication information further comprises a first silence indication field, and wherein:

the first silence indication field is used to indicate that the first data sent by the first network side device does not occupy a first resource element (RE), and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s); or the first silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s); or the first silence indication field is used to indicate that there is no unoccupied RE for the first network side device and the second network side device.

14. The communication apparatus according to claim 13, wherein:

in response to the processor of the first network side device determining the first indication information and second indication information when a second moment at which a signal sent by the network side device at a first moment arrives at the user equipment is later than a third moment at which a signal sent by the second network side device at the first moment arrives at the user equipment, and when a time difference between the second moment and the third moment is greater than or equal to a preset time period, wherein the first indication information comprises the first silence indication field; the first silence indication field is used to indicate that the first data sent by the network side device does not occupy the first resource element RE, and that the second data sent by the second network side device does not occupy the second RE; the RE that is in the symbol following the first RE and that is at the same frequency domain resource location as the first RE is used to carry the second demodulation reference signal(s); the RE that is in the symbol preceding the second RE and that is at the same frequency domain resource location as the second RE is used to carry the first demodulation reference signal(s); the second indication information comprises a second silence indication field; and the second silence indication field is used to indicate that the second data sent by the second network side device does not occupy the second RE; and the transmitter of the first network side device is further configured to send the second indication information to the second network side device; or in response to the processor of the first network device determining the first indication information and second indication information when a second moment at which a signal sent by the network side device at a first moment arrives at the user equipment is earlier than a third moment at which a signal sent by the second network side device at the first moment arrives at the user equipment, and when a time difference between the second moment and the third moment is greater than or equal to a preset time period, wherein the first indication information comprises a third silence indication field; the third silence indication field is used to indicate that the first data sent by the network side device does not occupy the third RE, and that the second data sent by the second network side device does not occupy the fourth RE; the RE that is in the symbol preceding the third RE and that is at the same frequency domain resource location as the third RE is used to carry the second demodulation reference signal(s); the RE that is in the symbol following the fourth RE and that is at the same frequency domain resource location as the fourth RE is used to carry the first demodulation reference signal(s); the second indication information comprises a fourth silence indication field; and the fourth silence indication field is used to indicate that the second data sent by the second network side device does not occupy the fourth RE; and the transmitter of the first network device sends the second indication information to the second network side device.

15. A first network side device, comprising:

a processor, configured to determine n antenna port(s) for sending first data and first demodulation reference signal(s) to user equipment in a subframe;

a transmitter, configured to send the first data and the first demodulation reference signal(s) to user equipment in the subframe by using the n antenna port(s), wherein the subframe is used by a second network side device to send second data and second demodulation reference signal(s) to the user equipment by using m antenna port(s), time-frequency resources occupied by the m antenna port(s) to send the second demodulation reference signal(s) do not carry time-frequency resources occupied by the n antenna port(s) to send the first demodulation reference signal(s), n and m are positive integers, the m antenna port(s) are not quasi co-located with the n antenna port(s), at least a part of a time-frequency resource occupied by the first data also carries the second data, and the first demodulation reference signal(s) and the second demodulation reference signal(s) are used by the user equipment to perform demodulation processing on the first data and/or the second data;

wherein the transmitter is further configured to:

send first indication information to the user equipment, wherein the first indication information includes an indication of the time-frequency resource occupied by the first data and a time-frequency resource occupied by the second data; wherein the first indication information further comprises a first silence indication field;

wherein the processor is further configured to:
  determine the first indication information and second indication information when a second moment at which a signal sent by the first network side device at a first moment arrives at the user equipment is later than a third moment at which a signal sent by the second network side device at the first moment arrives at the user equipment, and when a time difference between the second moment and the third moment is greater than or equal to a preset time period, or
  determine the first indication information and second indication information when a second moment at which a signal sent by the first network side device at a first moment arrives at the user equipment is earlier than a third moment at which a signal sent by the second network side device at the first moment arrives at the user equipment, and when a time difference between the second moment and the third moment is greater than or equal to a preset time period.

16. The first network side device according to claim 15, wherein the processor is further configured to perform modulation and coding processing on first original data by using a first modulation and coding scheme, to obtain a first code word, and, to perform layer mapping and precoding processing on the first code word to obtain the first data.

17. The first network side device according to claim 16, wherein the transmitter is further configured to:
  send third indication information to the user equipment, wherein the third indication information indicates a quantity n of transmission layers for the first code word and/or a quantity m of transmission layers for the second code word.

18. The first network side device according to claim 16, wherein
  the first code word is mapped to a layer 0 to a layer n−1, the layer 0 to the layer n−1 are mapped to the first n antenna port(s) in a first antenna port set of the network side device in order, the first n antenna port(s) are the n antenna port(s), antenna ports in the first antenna port set are arranged according to a preset rule, and n is less than or equal to a quantity of antenna ports in the first antenna port set; and
  the second code word is mapped to a layer n to a layer n+m−1, the layer n to the layer n+m−1 are mapped to the first m ports in a second antenna port set of the second network side device in order, the first m antenna port(s) are the m antenna port(s), antenna ports in the second antenna port set are arranged according to the preset rule, m is less than or equal to a quantity of antenna ports in the second antenna port set, and a port number of each antenna port in the second antenna port set is different from a port number of each antenna port in the first antenna port set.

19. The first network side device according to claim 15, wherein the first indication information further comprises a first silence indication field, wherein
  the first silence indication field is used to indicate that the first data sent by the first network side device does not occupy a first resource element (RE), and that the second data sent by the second network side device does not occupy a second RE; an RE that is in a symbol following the first RE and that is at a same frequency domain resource location as the first RE is used to carry the second demodulation reference signal(s); and an RE that is in a symbol preceding the second RE and that is at a same frequency domain resource location as the second RE is used to carry the first demodulation reference signal(s); or
  the first silence indication field is used to indicate that the first data sent by the first network side device does not occupy a third RE, and that the second data sent by the second network side device does not occupy a fourth RE; an RE that is in a symbol preceding the third RE and that is at a same frequency domain resource location as the third RE is used to carry the second demodulation reference signal(s); and an RE that is in a symbol following the fourth RE and that is at a same frequency domain resource location as the fourth RE is used to carry the first demodulation reference signal(s); or
  the first silence indication field is used to indicate that there is no unoccupied RE for the first network side device and the second network side device.

20. The first network side device according to claim 19, wherein:
  in response to the processor being configured to determine the first indication information and second indication information when the second moment at which the signal sent by the first network side device at the first moment arrives at the user equipment is later than the third moment at which the signal sent by the second network side device at the first moment arrives at the user equipment, and when the time difference between the second moment and the third moment is greater than or equal to the preset time period:
  the first indication information comprises the first silence indication field; the first silence indication field is used to indicate that the first data sent by the first network side device does not occupy the first resource element RE, and that the second data sent by the second network side device does not occupy the second RE; the RE that is in the symbol following the first RE and that is at the same frequency domain resource location as the first RE is used to carry the second demodulation reference signal(s); the RE that is in the symbol preceding the second RE and that is at the same frequency domain resource location as the second RE is used to carry the first demodulation reference signal(s); the second indication information comprises a second silence indication field; and the second silence indication field is used to indicate that the second data sent by the second network side device does not occupy the second RE; and
  the transmitter is further configured to send the second indication information to the second network side device; or
  in response to the processor being configured to determine the first indication information and second indication information when the second moment at which the signal sent by the network side device at the first moment arrives at the user equipment is earlier than the third moment at which the signal sent by the second network side device at the first moment arrives at the user equipment, and when the time difference between the second moment and the third moment is greater than or equal to the preset time period:
  the first indication information comprises a third silence indication field; the third silence indication field is used to indicate that the first data sent by the network side device does not occupy the third RE, and that the second data sent by the second network side device does not occupy the fourth RE; the RE that is in the symbol preceding the third RE and that is at the same frequency domain resource location as the third RE is used to carry the second demodulation reference signal(s); the RE that is in the symbol following the fourth RE and that is at the same frequency domain resource location as the fourth RE is used to carry the first demodulation reference signal(s); the second indication information comprises a fourth silence indication field; and the fourth silence indication field is used to indicate that the second data sent by the second network side device does not occupy the fourth RE; and the transmitter is further configured to send the second indication information to the second network side device.

* * * * *